(12) United States Patent  
Matsumoto

(10) Patent No.: US 9,135,733 B2  
(45) Date of Patent: Sep. 15, 2015

(54) IMAGE EDITING METHOD, IMAGE EDITING APPARATUS, PROGRAM FOR IMPLEMENTING IMAGE EDITING METHOD, AND RECORDING MEDIUM RECORDING PROGRAM

(75) Inventor: Kentaro Matsumoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 901 days.

(21) Appl. No.: 13/331,936

(22) Filed: Dec. 20, 2011

(65) Prior Publication Data

US 2012/0086726 A1 Apr. 12, 2012

Related U.S. Application Data

(63) Continuation of application No. 12/182,957, filed on Jul. 30, 2008, now Pat. No. 8,112,712, which is a continuation of application No. 10/662,362, filed on Sep. 16, 2003, now Pat. No. 7,454,707.

(30) Foreign Application Priority Data

Sep. 30, 2002 (JP) .................................. 2002-286343  
Sep. 30, 2002 (JP) .................................. 2002-286344

(51) Int. Cl.  
*G06T 11/60* (2006.01)  
*G06F 3/0484* (2013.01)

(52) U.S. Cl.  
CPC .............. *G06T 11/60* (2013.01); *G06F 3/0484* (2013.01)

(58) Field of Classification Search  
CPC . G06F 3/0484; G06F 3/0481; G06F 3/04886; G06F 3/04847

USPC .......................................... 715/788, 722–725  
See application file for complete search history.

(56) References Cited

U.S. PATENT DOCUMENTS 4,720,703 A * 1/1988 Schnarel et al. .............. 345/163  
4,893,258 A * 1/1990 Sakuragi ....................... 345/668

(Continued)

FOREIGN PATENT DOCUMENTS

JP 7-285245 A 10/1995  
JP 11-341272 A 12/1999

(Continued)

OTHER PUBLICATIONS

Casio Computer Col., Ltd., "QV-4000 Digital Camera User Documentation", http://world.casio.com/qv/download/en/manual/qv4000.html>, Sep. 2001.  
Leong, Edwin, "Camera Hobby Photograph e-Book", Ch. 15-16, http://www.camerahobby.com/EBook-TOC.htm>, Oct. 29, 2004.  
Search Report in EP 03255844.

*Primary Examiner* — Steven B Theriault  
(74) *Attorney, Agent, or Firm* — Fitzpatrick, Cella, Harper & Scinto

(57) ABSTRACT

To provide an image editing technique that enables a user to perform movement and magnification of an image with a single operation, and to perform trimming while grasping image composition in printing, the image editing method includes a step of instructing to move an arbitrary point of an image displayed in an image display area among image data; a step of calculating an image movement amount and a magnification ratio in response to the instruction to move the arbitrary point; and a step displaying a predetermined area of the image data in the image display area on the basis of the image movement amount and the magnification ratio, which are calculated in the calculating step.

12 Claims, 20 Drawing Sheets

(56) References Cited

U.S. PATENT DOCUMENTS

| | | | |
|---|---|---|---|
| 4,907,095 A | 3/1990 | Komura et al. | |
| 4,935,728 A * | 6/1990 | Kley | 345/161 |
| 4,980,781 A * | 12/1990 | Yamamoto et al. | 358/474 |
| 5,038,138 A * | 8/1991 | Akiyama et al. | 345/684 |
| 5,073,771 A * | 12/1991 | Satta et al. | 345/667 |
| 5,075,673 A * | 12/1991 | Yanker | 345/163 |
| 5,172,234 A | 12/1992 | Arita et al. | |
| 5,187,776 A | 2/1993 | Yanker | |
| 5,196,838 A * | 3/1993 | Meier et al. | 345/684 |
| 5,239,389 A | 8/1993 | Kochis et al. | |
| 5,289,168 A * | 2/1994 | Freeman | 345/672 |
| 5,298,890 A * | 3/1994 | Kanamaru et al. | 345/157 |
| 5,300,927 A * | 4/1994 | Arai et al. | 345/157 |
| 5,333,247 A * | 7/1994 | Gest et al. | 345/672 |
| 5,337,406 A * | 8/1994 | Takakura et al. | 715/202 |
| 5,347,724 A * | 9/1994 | Hankins | 33/563 |
| 5,363,211 A | 11/1994 | Hasebe et al. | |
| 5,396,590 A | 3/1995 | Kreegar | |
| 5,428,721 A | 6/1995 | Sato et al. | |
| 5,459,586 A | 10/1995 | Nagasato et al. | |
| 5,467,441 A | 11/1995 | Stone et al. | |
| 5,467,451 A * | 11/1995 | Burkis et al. | 715/856 |
| 5,485,174 A * | 1/1996 | Henshaw et al. | 345/684 |
| 5,495,566 A * | 2/1996 | Kwatinetz | 715/785 |
| 5,528,260 A * | 6/1996 | Kent | 345/684 |
| 5,568,603 A * | 10/1996 | Chen et al. | 715/784 |
| 5,581,670 A * | 12/1996 | Bier et al. | 715/856 |
| 5,596,690 A | 1/1997 | Stone et al. | |
| 5,611,060 A * | 3/1997 | Belfiore et al. | 715/819 |
| 5,615,384 A * | 3/1997 | Allard et al. | 715/800 |
| 5,619,738 A | 4/1997 | Petruchik et al. | |
| 5,627,660 A | 5/1997 | Kusano et al. | |
| 5,638,523 A * | 6/1997 | Mullet et al. | 715/855 |
| 5,657,050 A * | 8/1997 | McCambridge et al. | 715/856 |
| 5,670,984 A * | 9/1997 | Robertson et al. | 345/585 |
| 5,689,284 A * | 11/1997 | Herget | 345/661 |
| 5,694,624 A * | 12/1997 | Daitoku et al. | 396/60 |
| 5,714,972 A * | 2/1998 | Tanaka et al. | 345/156 |
| 5,732,161 A * | 3/1998 | Kuroda et al. | 382/284 |
| 5,739,821 A * | 4/1998 | Ho et al. | 715/807 |
| 5,754,348 A * | 5/1998 | Soohoo | 359/802 |
| 5,757,368 A * | 5/1998 | Gerpheide et al. | 715/769 |
| 5,790,921 A * | 8/1998 | Ishikura et al. | 399/86 |
| 5,818,423 A * | 10/1998 | Pugliese et al. | 345/157 |
| 5,818,455 A * | 10/1998 | Stone et al. | 345/684 |
| 5,841,437 A * | 11/1998 | Fishkin et al. | 345/619 |
| 5,848,430 A * | 12/1998 | Takakura et al. | 715/202 |
| 5,861,889 A | 1/1999 | Wallace et al. | |
| 5,864,330 A * | 1/1999 | Haynes | 715/856 |
| 5,870,079 A * | 2/1999 | Hennessy | 345/159 |
| 5,874,936 A * | 2/1999 | Berstis et al. | 715/785 |
| 5,874,957 A * | 2/1999 | Cline et al. | 715/786 |
| 5,877,748 A * | 3/1999 | Redlich | 345/163 |
| 5,929,840 A * | 7/1999 | Brewer et al. | 715/862 |
| 5,950,045 A | 9/1999 | Nomura et al. | |
| 5,956,032 A * | 9/1999 | Argiolas | 715/798 |
| 5,969,706 A * | 10/1999 | Tanimoto et al. | 345/671 |
| 6,011,547 A | 1/2000 | Shiota et al. | |
| 6,016,145 A * | 1/2000 | Horvitz et al. | 715/788 |
| 6,052,110 A * | 4/2000 | Sciammarella et al. | 345/661 |
| 6,072,962 A | 6/2000 | Parulski | |
| 6,091,395 A * | 7/2000 | DeStefano | 715/862 |
| 6,097,387 A * | 8/2000 | Sciammarella et al. | 715/784 |
| 6,128,633 A | 10/2000 | Michelman et al. | |
| 6,137,957 A | 10/2000 | Kobayashi et al. | |
| 6,169,546 B1 * | 1/2001 | Bogdan | 715/786 |
| 6,184,859 B1 * | 2/2001 | Kojima | 345/629 |
| 6,195,101 B1 | 2/2001 | Ghislain Bossut et al. | |
| 6,236,389 B1 * | 5/2001 | Imaizumi et al. | 715/788 |
| 6,288,705 B1 * | 9/2001 | Rosenberg et al. | 345/163 |
| 6,292,174 B1 * | 9/2001 | Mallett et al. | 345/163 |
| 6,295,419 B1 | 9/2001 | Kobayashi et al. | |
| 6,300,955 B1 | 10/2001 | Azmir | |
| 6,304,271 B1 * | 10/2001 | Nehme | 345/620 |
| 6,320,599 B1 | 11/2001 | Sciammarella et al. | |
| 6,396,962 B1 * | 5/2002 | Haffey et al. | 382/298 |
| 6,407,749 B1 * | 6/2002 | Duke | 345/684 |
| 6,424,355 B2 * | 7/2002 | Watanabe et al. | 345/668 |
| 6,426,760 B1 | 7/2002 | Takahashi | |
| 6,437,801 B1 | 8/2002 | Cave | |
| 6,452,605 B1 * | 9/2002 | Kawashima | 345/661 |
| 6,456,745 B1 | 9/2002 | Bruton et al. | |
| 6,469,709 B1 | 10/2002 | Sakai | |
| 6,480,207 B1 * | 11/2002 | Bates et al. | 715/800 |
| 6,501,487 B1 * | 12/2002 | Taguchi | 715/788 |
| 6,512,521 B1 * | 1/2003 | Era | 345/473 |
| 6,587,596 B1 | 7/2003 | Haeberli | |
| 6,613,100 B2 * | 9/2003 | Miller | 715/273 |
| 6,633,305 B1 * | 10/2003 | Sarfeld | 345/671 |
| 6,657,658 B2 | 12/2003 | Takemura | |
| 6,677,965 B1 * | 1/2004 | Ullmann et al. | 715/786 |
| 6,694,487 B1 | 2/2004 | Ilsar | |
| 6,704,034 B1 * | 3/2004 | Rodriguez et al. | 715/860 |
| 6,714,218 B1 | 3/2004 | Bian | |
| 6,731,285 B2 * | 5/2004 | Matchen | 345/428 |
| 6,803,931 B1 * | 10/2004 | Roman et al. | 715/800 |
| 6,825,860 B1 * | 11/2004 | Hu et al. | 715/801 |
| 6,832,009 B1 | 12/2004 | Shezaf et al. | |
| 6,907,576 B2 * | 6/2005 | Barbanson et al. | 715/791 |
| 6,956,590 B1 * | 10/2005 | Barton et al. | 345/684 |
| 6,968,502 B1 * | 11/2005 | Kubomura et al. | 715/202 |
| 6,971,062 B1 | 11/2005 | Tolpin | |
| 7,133,571 B2 | 11/2006 | Cheatle | |
| 7,148,909 B2 * | 12/2006 | Yui et al. | 345/660 |
| 7,190,379 B2 * | 3/2007 | Nissen | 345/660 |
| 7,197,718 B1 * | 3/2007 | Westerman et al. | 715/801 |
| 7,209,149 B2 | 4/2007 | Jogo | |
| 7,213,214 B2 | 5/2007 | Baar et al | |
| 7,240,296 B1 * | 7/2007 | Matthews et al. | 715/840 |
| 7,274,377 B2 * | 9/2007 | Ivashin et al. | 345/619 |
| 7,275,219 B2 * | 9/2007 | Shoemaker | 715/801 |
| 7,293,246 B2 * | 11/2007 | Baudisch et al. | 715/858 |
| 7,302,650 B1 | 11/2007 | Allyn et al. | |
| 7,310,884 B2 | 12/2007 | Fleischer | |
| 7,405,739 B2 * | 7/2008 | Gannon | 345/660 |
| 7,562,311 B2 * | 7/2009 | Schiller | 715/838 |
| 7,574,101 B2 | 8/2009 | Gohara et al. | |
| 7,593,038 B2 | 9/2009 | Ochiai | |
| 7,620,911 B2 * | 11/2009 | Webb | 715/809 |
| 7,760,956 B2 | 7/2010 | Lin et al. | |
| 7,796,781 B2 | 9/2010 | Echigo et al. | |
| 7,804,508 B2 * | 9/2010 | Ubillos et al. | 345/648 |
| 7,900,158 B2 * | 3/2011 | Ngari et al. | 715/801 |
| 8,806,363 B1 * | 8/2014 | Sonawala | 715/779 |
| 2001/0030654 A1 * | 10/2001 | Iki | 345/629 |
| 2001/0030667 A1 * | 10/2001 | Kelts | 345/854 |
| 2001/0035875 A1 * | 11/2001 | Suzuki et al. | 345/723 |
| 2001/0040636 A1 * | 11/2001 | Kato et al. | 348/333.03 |
| 2002/0015190 A1 * | 2/2002 | Mochizuki | 358/451 |
| 2002/0024530 A1 * | 2/2002 | Van Liere | 345/700 |
| 2002/0030634 A1 * | 3/2002 | Noda et al. | 345/5 |
| 2002/0033849 A1 * | 3/2002 | Loppini et al. | 345/848 |
| 2002/0075289 A1 * | 6/2002 | Hatori et al. | 345/698 |
| 2002/0085771 A1 * | 7/2002 | Sakuramoto | 382/282 |
| 2002/0109671 A1 * | 8/2002 | Kawasome | 345/156 |
| 2002/0118299 A1 * | 8/2002 | Kahn | 348/569 |
| 2002/0140665 A1 * | 10/2002 | Gordon | 345/156 |
| 2002/0180801 A1 | 12/2002 | Doyle et al. | |
| 2003/0020671 A1 | 1/2003 | Santoro et al. | |
| 2003/0043909 A1 | 3/2003 | Akiyoshi et al. | |
| 2003/0063295 A1 * | 4/2003 | Kinjo | 358/1.1 |
| 2003/0076363 A1 * | 4/2003 | Murphy | 345/800 |
| 2003/0098872 A1 | 5/2003 | Georgiev | |
| 2003/0107604 A1 * | 6/2003 | Ording | 345/788 |
| 2003/0137525 A1 | 7/2003 | Smith | |
| 2003/0164861 A1 * | 9/2003 | Barbanson et al. | 345/815 |
| 2003/0169343 A1 * | 9/2003 | Kagaya et al. | 348/207.1 |
| 2004/0025112 A1 * | 2/2004 | Chasen et al. | 715/501.1 |
| 2004/0070626 A1 | 4/2004 | Matsumoto | |
| 2004/0109029 A1 * | 6/2004 | Bjorkman et al. | 345/772 |
| 2004/0120606 A1 | 6/2004 | Fredlund | |
| 2004/0125138 A1 | 7/2004 | Jetha et al. | |
| 2004/0223626 A1 | 11/2004 | Honsinger et al. | |
| 2004/0250216 A1 * | 12/2004 | Roman et al. | 715/800 |

(56) References Cited

U.S. PATENT DOCUMENTS

| | | | |
|---|---|---|---|
| 2005/0041044 A1* | 2/2005 | Gannon | 345/660 |
| 2005/0060658 A1* | 3/2005 | Tsukiori | 715/765 |
| 2005/0088418 A1* | 4/2005 | Nguyen | 345/173 |
| 2005/0128518 A1 | 6/2005 | Tsue et al. | |
| 2005/0168488 A1* | 8/2005 | Montague | 345/659 |
| 2006/0059440 A1* | 3/2006 | Pry | 715/838 |
| 2009/0228820 A1* | 9/2009 | Kim et al. | 715/769 |
| 2009/0249229 A1* | 10/2009 | Offer | 715/760 |
| 2010/0115459 A1* | 5/2010 | Kinnunen et al. | 715/785 |

FOREIGN PATENT DOCUMENTS

| | | |
|---|---|---|
| JP | 2000-022927 A | 1/2000 |
| JP | 2000-83222 A | 3/2000 |
| JP | 2000-217024 A | 8/2000 |
| JP | 2000-261644 A | 9/2000 |
| JP | 2004-520735 A | 7/2004 |

* cited by examiner

FIG. 11A
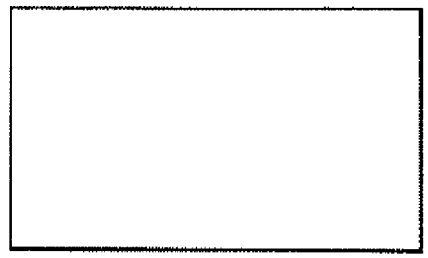
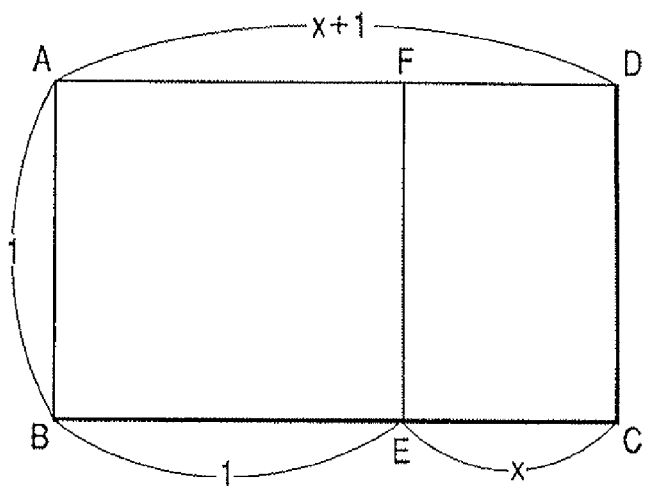
FIG. 11B
FIG. 11C
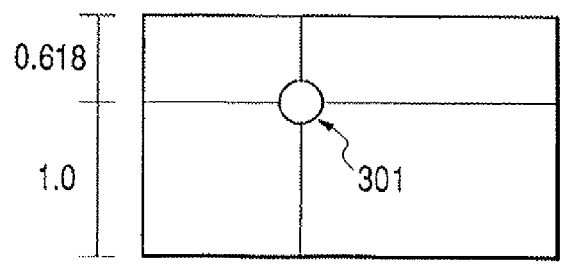

IMAGE EDITING METHOD, IMAGE EDITING APPARATUS, PROGRAM FOR IMPLEMENTING IMAGE EDITING METHOD, AND RECORDING MEDIUM RECORDING PROGRAM

This application is a continuation of U.S. application Ser. No. 12/182,957, filed Jul. 30,2008 (allowed), which is a continuation of U.S. application Ser. No. 10/662,362, filed Sep.16,2003 (now U.S. Pat. No. 7,454,707), the contents of which are incorporated herein by reference.

BACKGROUND OF THE INVENTION

1. Field of the Invention

The present invention relates to an image editing technique, and in particular to a technique with which when a still image or a moving image photographed with a digital still camera, a digital video camera, or the like is to be displayed and/or printed, composition of the image may be adjusted while displaying the image.

2. Related Background Art

Commonly used is a function with which image data photographed with a digital camera is fetched and is displayed on a display device, an arbitrary area of the image is designated as a trimming area using a pointing device such as a mouse or a remote controller, and the designated trimming area is printed. FIG. 6 shows an example of a very commonly performed trimming process. In this drawing, a trimming frame 602 is displayed so that it is superimposed on a pre-trimming image 601, and a user designates his/her desired part of the image 601 by reducing/magnifying, rotating, and moving the trimming frame 602. In this manner, a post-trimming image 603 having composition desired by the user is finally obtained.

As another conventional technique of obtaining such a post-trimming image in a different manner, for instance, a technique disclosed in Japanese Patent Application Laid-Open No. 2000-83222 is known in which a television set is connected to a digital image editing apparatus which stores certain image editing software, and image data is displayed so as to be fitted in the display area of a screen of the television set. Then, the image data is magnified to a size exceeding the display area of the television set and the magnified image data is moved in a direction corresponding to an instruction from the outside and is changed so as to be displayed in the display area. Japanese Patent Application Laid-Open No. 2000-217024 discloses a technique in which the same method is applied to a digital camera and which is characterized in that the digital camera is equipped with a cross key for performing a magnification operation and a cross key for designating a position.

As still another conventional technique, a technique disclosed in Japanese Patent Application Laid-Open No. 11-341272 is known with which image data obtained by photographing a face of a person is displayed, predetermined two points of the image data are designated with a designation means, an image magnification/reduction ratio giving a face size and position best-suited to the size of output paper is obtained based on the designated two points, and a resultant image is printed at a given position.

When a trimming operation is performed in the manner shown in FIG. 6, the user reduces and moves the trimming frame while viewing the whole image, so that it is easy for the user to understand which part of the original image is intended to be clipped. However, there is a shortcoming that it is difficult for the user to grasp an impression that would be given by post-trimming image composition when the image is actually printed in a print area.

In contrast to this, with the techniques disclosed in Japanese Patent Application Laid-Open No. 2000-83222 and Japanese Patent Application Laid-Open No. 2000-217024, it is easy to grasp composition of an image to be actually printed. However, trimming is performed by first magnifying an image and then moving the magnified image to change the position thereof, so that it is required to perform two steps, i.e., a magnification operation and a moving operation.

Also, the technique disclosed in Japanese Patent Application Laid-Open No. 11-341272 relates to creation of a certificate photograph and is aimed at obtaining the size and position of a face best-suited to the size of paper on which the face is to be printed. Therefore, the points to be designated by the user are preset at the top of a head and the tip of a jaw, for instance, and therefore the application purpose of this technique differs from general view angle correction of snapshots.

Further, with each of the conventional techniques described above, a user determines a trimming position and size while viewing the overall composition, so that the appearance of a post-trimming image composition greatly depends on the experience and ability of the user. Also, such the determination of composition itself is burdensome for some users, so that even if it is possible to obtain photographs beyond recognition through trimming of images, they often print the images without using the trimming function.

When a main object (a person, in many cases) exists in the center area of an image like in the example shown in FIG. 6, for instance, it is possible to obtain composition with a sense of spreading by increasing a front space in a sight direction of the person. On the other hand, in the case of an example shown in FIG. 13 in which a trimming frame 1802 is set on a pre-trimming image 1801 and a post-trimming image 1803 is generated, a front space in a sight direction of the person is narrowed and this results in composition giving a restless feeling.

In a like manner, when a moving subject is photographed like in an example shown in FIG. 15A, it is difficult to take a photograph having desired composition. In the illustrated example, a go-cart is photographed in the center area of the photograph. However, by increasing a front space in a traveling direction, it is possible to obtain composition with a sense of motion. Such an image is a good example of an image with which it is possible to obtain a photograph beyond recognition through trimming. Even in this case, however, it is difficult for a user, in particular for a beginner, to determine a position where the go-cart (main object in this case) should be positioned through trimming in order to obtain a generally favorable composition.

SUMMARY OF THE INVENTION

The present invention has been made in order to solve all or at least one of the aforementioned problems of the conventional techniques.

An object of the present invention is to provide an image editing technique that enables a user to perform movement and magnification of an image with ease by the less number of operations performed by the user.

Further, another object of the present invention is to provide an image editing technique with which at the time of trimming an image photographed with a digital camera or the like, it is possible to determine composition of the image with ease.

In order to realize the above-mentioned objects an image editing method according to the present invention, comprising the steps of:

instructing to move an arbitrary point of an image displayed in an image display area among image data;

calculating an image movement amount and a magnification ratio in response to an instruction to move the arbitrary point; and displaying a predetermined area of the image data in the image display area on the basis of the image movement amount and the magnification ratio, which are calculated in the calculating step.

Other objects and features of the present invention will become apparent from the following description of preferred embodiments to be made with reference to the accompanying drawings.

BRIEF DESCRIPTION OF THE DRAWINGS

FIGS. 11A, 11B, and 11C illustrate a grid based on a golden section;

DESCRIPTION OF THE PREFERRED EMBODIMENTS

Preferred embodiments of the present invention will now be described with reference to the accompanying drawings.

First Embodiment

Figure 1:
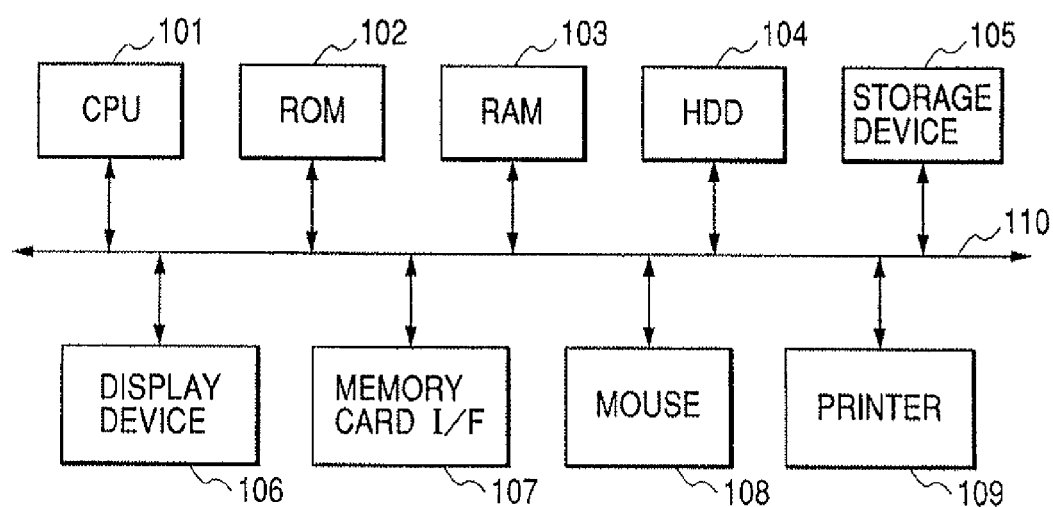
FIG. 1 shows an example of the hardware construction of an image editing apparatus according to first to third embodiments of the present invention.

FIG. 1 shows an example of a hardware construction of an image editing apparatus according to first to sixth embodiments of the present invention. In this drawing, reference numeral 101 denotes a CPU (central processing unit) that executes computer software programs; numeral 102, a ROM (read-only memory) in which programs are stored; numeral 103, a RAM (random-access memory) that is used at the time of execution of the programs; numeral 104, a hard disk drive (HDD) in which the programs are stored; numeral 105, a storage device that stores programs and data on a medium such as a flexible disk or an MO (magneto-optical disk); numeral 106, a display device for displaying execution results and execution states of the programs; numeral 107, a memory card interface into which a memory card is inserted and which writes and reads data into and from the inserted memory card; numeral 108, a mouse and a keyboard; numeral 109, a printer; and numeral 110, a bus.

In this embodiment, two coordinate systems that are a display memory coordinate system for displaying an image on the display 106 and an image coordinate system for expressing a position on image data are used to determine an area to be clipped from the image data after movement of the mouse 108 and a magnification ratio at the time of writing for displaying on the display 106. Thereafter, writing into a display memory area is performed according to the determined clipping area and magnification ratio.

Description of Display Memory Coordinate System

Figure 5:
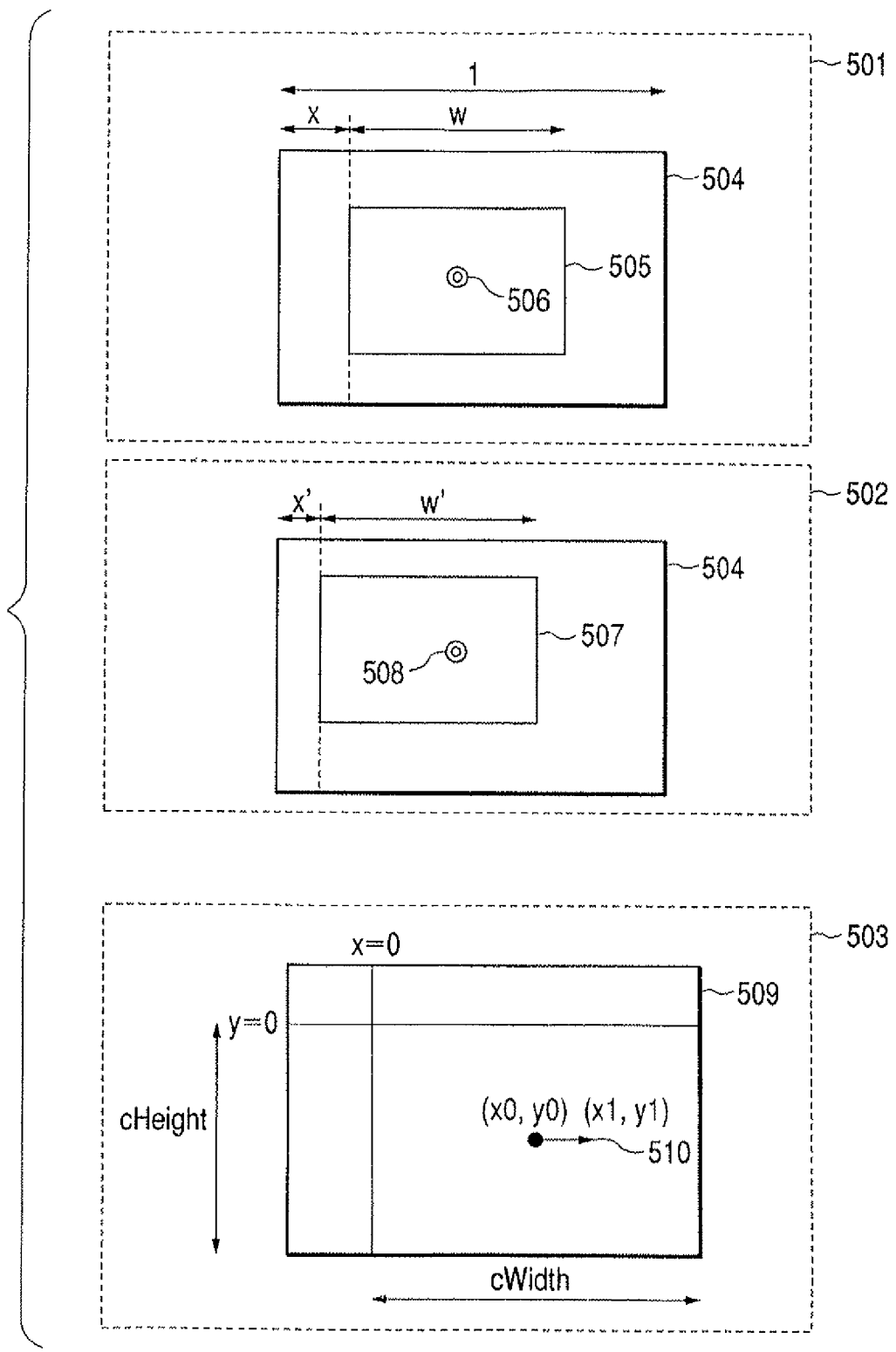
FIG. 5 shows the image coordinate system and the display memory coordinate system.
Figure 6:
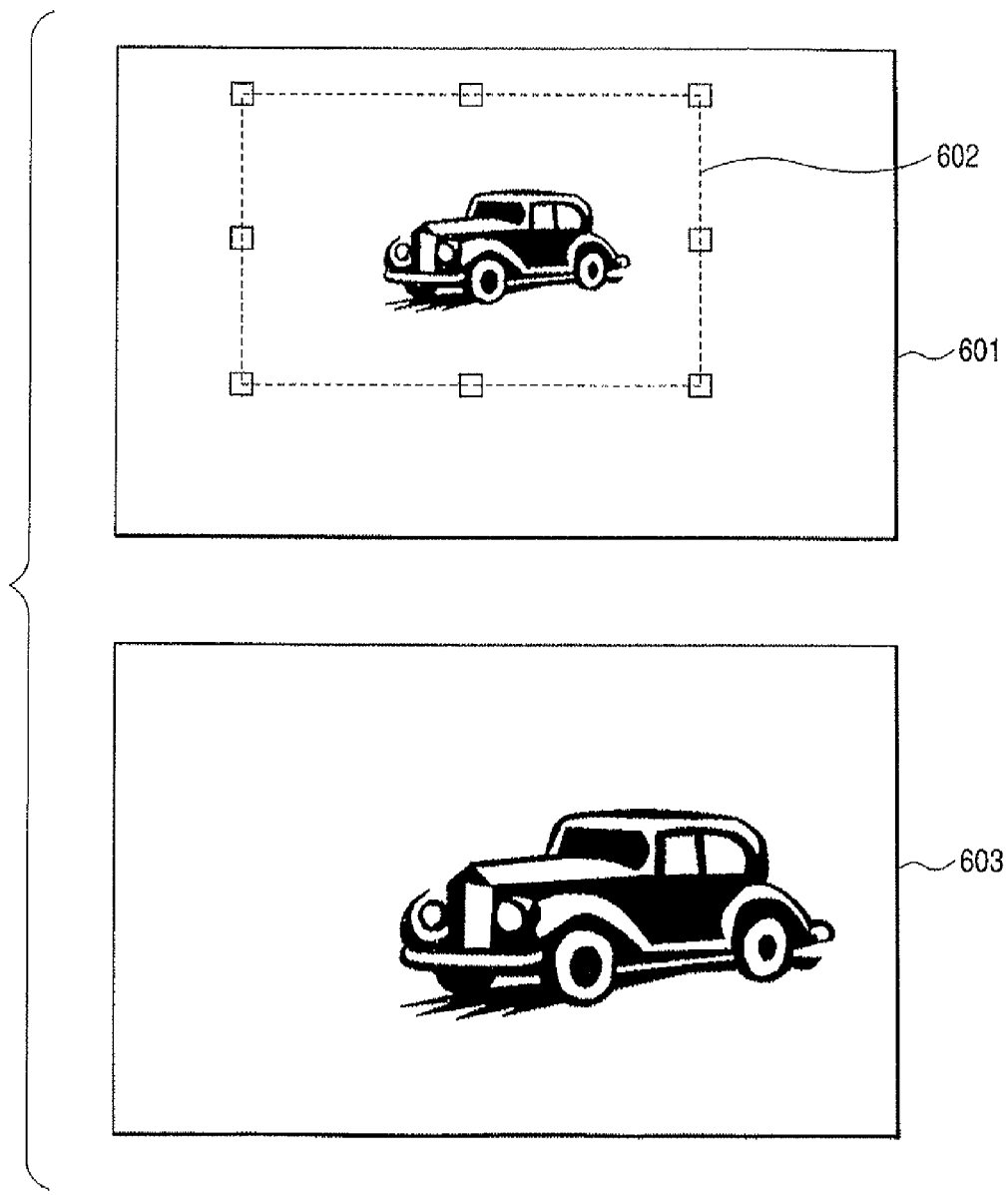
FIG. 6 shows an example of a trimming process performed with a conventional technique.

The display memory coordinate system is shown in FIG. 5 (see reference numeral 503). In this drawing, a point of x=y=0 is set as an origin, an x-axis extends in the rightward direction on a paper plane of this drawing, and a y-axis extends in the downward direction thereon. An image is written into a display area having a width " cWidth" and a height "cHeight", with the origin (0, 0) being set as an upper left-hand point of the image. Also, designation of a coordinate on this display memory coordinate system is performed with the mouse. When an arbitrary point of the displayed image is dragged with the mouse, a coordinate designated with the mouse is changed from a pre-movement point (x0, y0) to a post-movement point (x1, y1) (see reference numeral 510). This mouse dragging is an operation in which the mouse is moved while keeping the left button of the mouse pressed down. Here, the left button is pressed down at the pre-movement point (x0, y0) and is released at the post-movement point (x1, y1).

Description of Image Coordinate System

The image coordinate system that is another coordinate system used in this embodiment is also shown in FIG. 5 (see reference numerals 501 and 502). Reference numeral 501 denotes a state in which movement through the mouse dragging is not yet performed, while reference numeral 502 denotes a post-movement state. In FIG. 5, reference numeral 504 denotes an outer edge of an image; numerals 505 and 507, each a trimming frame showing a trimming area; and numerals 506 and 508, each a coordinate designated with the mouse. The image coordinate system is normalized so that the length of the image outer edge 504 on the x-axis becomes one. The mouse coordinate 506 on the image coordinate system corresponds to the pre-movement point (x0, y0) on the display coordinate system, while the post-movement mouse coordinate 508 corresponds to the post-movement point (x1, y1) on the display coordinate system. Also, even after an arbitrary point of the image is designated on the display and is grasped and moved (dragged), the point designated with the mouse on the image coordinate system is not changed and therefore the pre-movement point 506 and the post-movement point 508 are the same on the image coordinate system. Also, no difference occurs in the image outer edge 504 between before and after the movement and only the trimming frame is moved leftward from the pre-movement trimming frame 505 to the post-movement trimming frame 507.

A user is capable of performing trimming to obtain an appropriate composition by, for instance, changing the position of a main object displayed on the display. The user first moves a mouse pointer onto the point (x0, y0) on the display coordinate system, at which the main object is positioned, and then drags the main object from the point (x0, y0) to the point (x1, y1) on the display coordinate system. In this manner, the user moves the main object from the center to the right-hand side. When the mouse pointer is moved through a dragging operation, the main object is moved so as to follow the mouse pointer. As a result, the mouse positions 506 and 508 on the image coordinate system before and after the movement both indicate the same position of the main object. The rightward movement of the main object from (x0, y0) to (x1, y1) on the display coordinate system is instructed, so that the trimming frame is moved leftward from the pre-movement position 505 to the post-movement position 507 without causing any difference between the points 506 and 508 of the main object on the image coordinate system. The magnification ratio is determined so that the trimming frames 505 and 507 become appropriate to the size of the display area of the display. The trimming frames 505 and 507 have the same size and images before and after the movement have the same magnification ratio. Also, displaying on the display is performed so that the upper left-hand coordinates of the trimming frames 505 and 507 coincide with the point (0, 0) on the display coordinate system.

Next, description will be made of a display coordinate system 403, an image coordinate system 401 before dragging movement and an image coordinate system 402 after the dragging movement shown in FIG. 4. On the image coordinate system 501 before the movement in FIG. 5, the trimming frame 505 exists inside the image outer edge 504. On the image coordinate system 401 before the movement in FIG. 4, however, a left end of a trimming frame 405 contacts a left end of an image outer edge 404.

Figure 4:
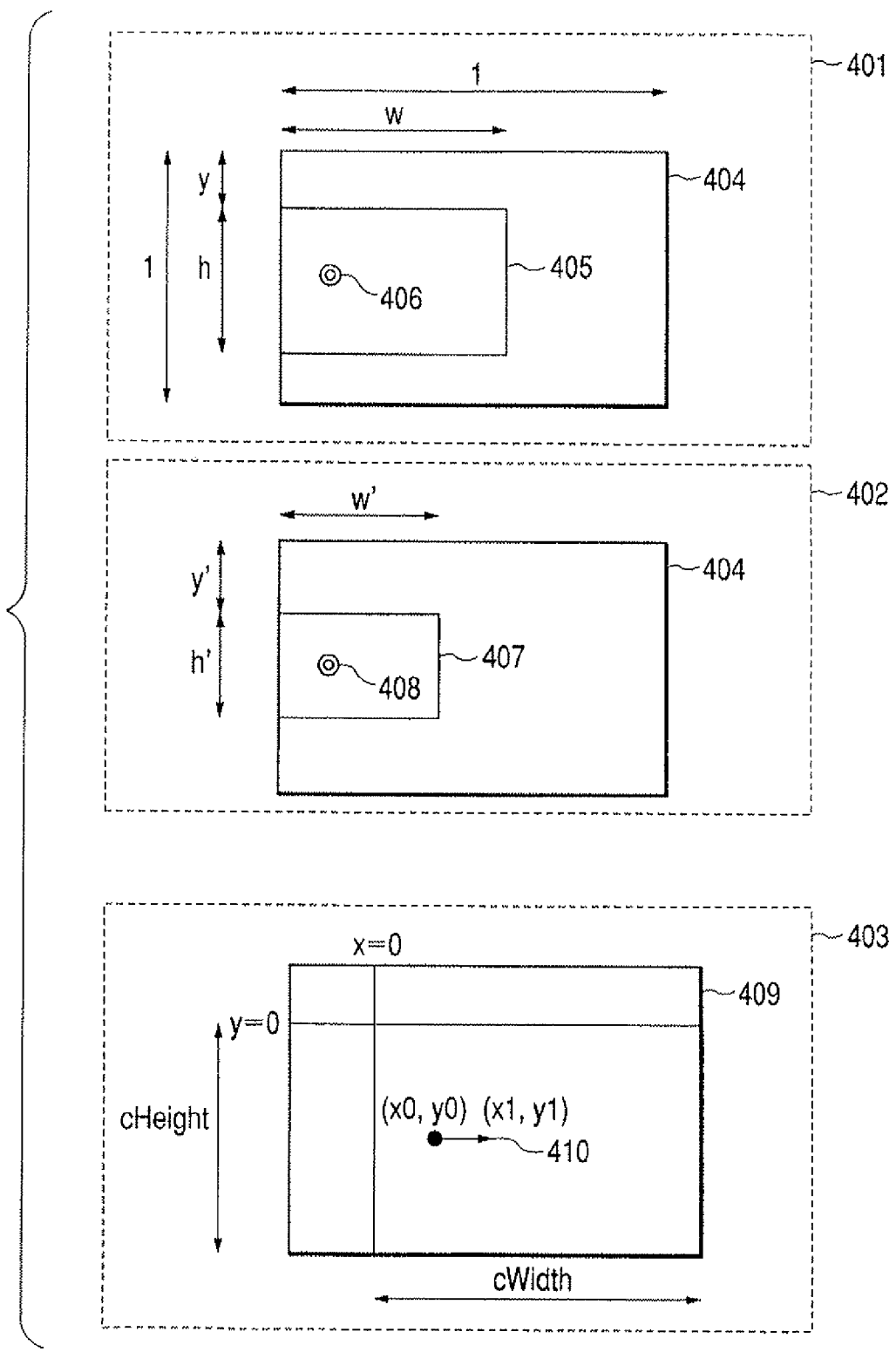
FIG. 4 shows an image coordinate system and a display memory coordinate system.

FIG. 4 shows a case where a dragging operation with the mouse is performed so that movement from (x0, y0) to (x1, y1) is performed on the display coordinate system as in FIG. 5. If it is intended to move the pre-movement trimming frame 405 leftward as in FIG. 5, this results in a situation where the trimming frame 405 extends out from the image outer edge 404 and an area having no image data enters into the trimming frame 405. In view of this problem, as shown in FIG. 4, the size of a post-movement trimming frame 407 is reduced from that of the pre-movement trimming frame 405 so that a left end of the trimming frame 407 coincides with the left end of the image outer edge 404. Mouse positions 406 and 408 before and after the movement indicate the same main object. The image inside the trimming frames 405 and 407 is magnified to the size of the display. Consequently, the magnification ratio of a displayed image in the post-movement trimming frame 407 becomes larger than that of a displayed image in the pre-movement trimming frame 405. That is, through this trimming operation, the main object on the display is moved rightward and is magnified. As a result, it becomes possible to perform a moving process and a magnification process through a single dragging operation.

As described above, when dragging is performed and it is instructed to move the trimming frame 405 so that an end of the image outer edge 404 in a direction opposite to a moving direction is exceeded, the image is magnified based on an exceeding amount to display the magnified image. Also, regardless of the magnification ratio, displaying is performed so that the image at the pre-movement point designated by dragging is moved to the post-movement point. In more detail, an image movement amount and magnification ratio are calculated so that the image at the designated pre-movement point is moved to the post-movement point without generating any margin in the trimming frame. Then, the image is displayed based on the calculated image movement amount and magnification ratio.

Figure 2:
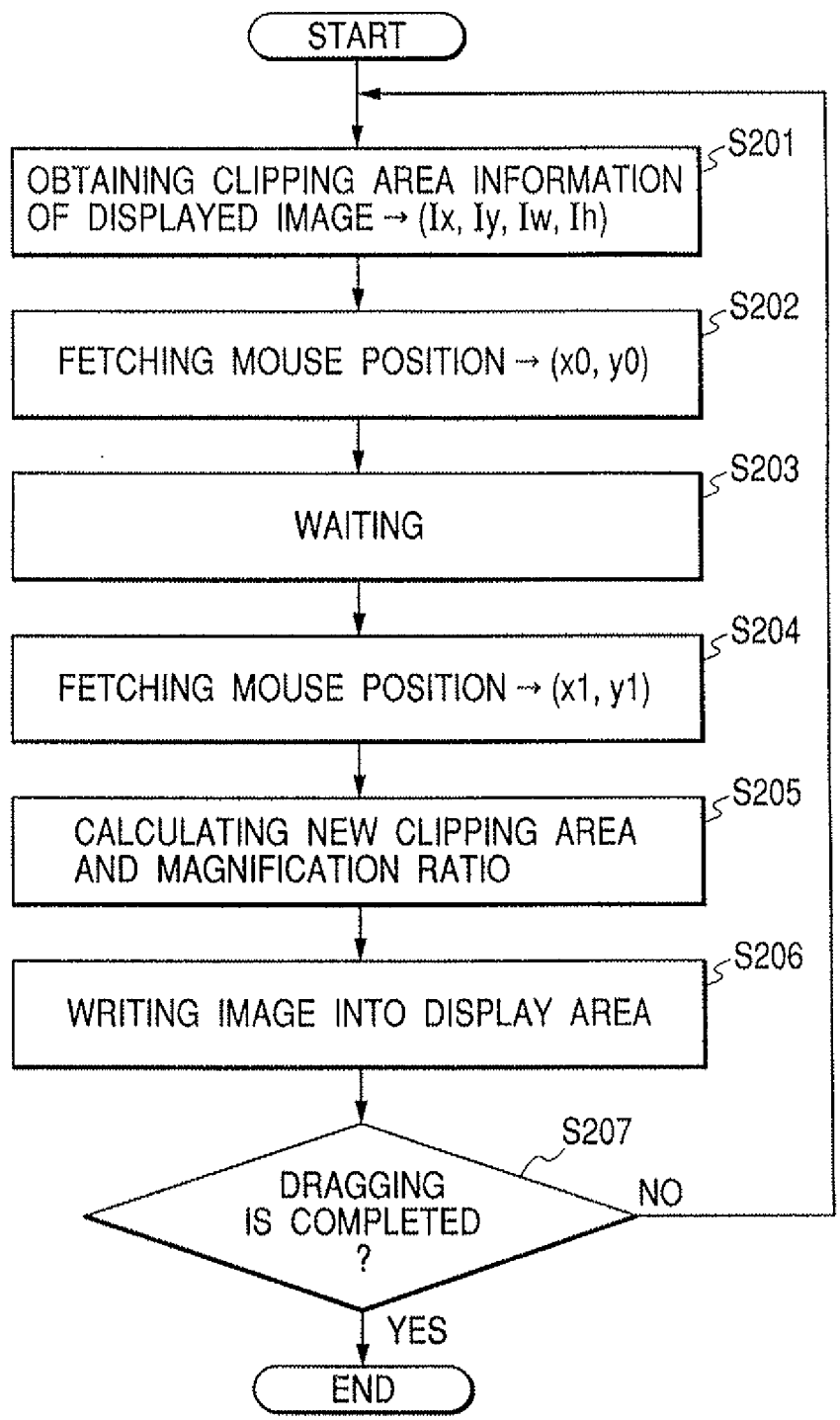
FIG. 2 is a flowchart of a process performed with an image editing method according to the first embodiment.

FIG. 2 is a flowchart showing a process performed with an image editing method according to the first embodiment of the present invention. Hereinafter, the first embodiment of the present invention will be described by following this flowchart. When a dragging operation with the mouse is performed, the following process is started.

In step S201, the position (Ix, Iy), width Iw, and height Ih of the clipping frame (trimming frame) on the image coordinate system at that point in time are obtained. That is, as shown in FIGS. 4 and 5, the position of an upper left-hand point of the image outer edge 404/504 is set as (0, 0). Then, the position of an upper left-hand point of the clipping frame 405/505 on the image coordinate system is substituted into (Ix, Iy) and the width and height of the clipping frame 405/505 thereon are substituted into (Iw, Ih).

In step S202, the coordinate of the pre-movement position of the mouse on the display memory coordinate system is fetched and is substituted into (x0, y0).

In step S203, a waiting operation is performed for a given length of time preset in order to capture movement of the mouse.

In step S204, the coordinate of the post-movement position of the mouse on the display memory coordinate system is fetched and is substituted into (x1, y1).

In step S205, as shown in FIGS. 4 and 5, the position (x', y'), width w', and height h' of the new clipping frame 407/507 are operated and a magnification ratio is also operated. A method of calculating x', y', w', and h' will be described later.

In step S206, an image in the new clipping frame 407/507 designated by x', y', w', and h' obtained in step S205 is read out and is written onto the display memory coordinate system at the obtained magnification ratio. As a result, an image is displayed on the display.

In step S207, it is judged whether the mouse dragging is completed. If the mouse dragging is completed, the process is ended; if not, the process returns to step S201 and the same operations are repeated. When the process is ended, a post-trimming image is printed or saved. The clipping frame is an image print area showing an image area to be printed. When the user instructs to print the image displayed in the clipping frame, the image inside the clipping frame is printed.

By performing the image editing process described above, a main object is moved and/or magnified so as to follow the mouse pointer and is successively displayed during a dragging operation. As a result, it becomes possible to perform trimming while grasping composition at the time of printing.

Next, a method used in step S205 to calculate the position (x', y'), width w', and height h' of the new clipping frame will be described. Note that for ease of explanation, in the following description, a case where the mouse is horizontally moved from the left to the right, that is, moved in the forward direction of the x-axis will be described. However, even if the mouse is moved in a reverse direction, a top-to-bottom direction, or an inclined direction, the calculation is possible with the same method.

The method of obtaining the position, width, and height of the new clipping frame will be considered based on two cases of an initial state, one of which is a case of x=0 where the clipping frame 405 contacts the image outer edge 404 as indicated by 401 in FIG. 4 and the other of which is a case of x≠0 where the clipping frame 505 does not contact the image outer edge 504 as indicated by 501 in FIG. 5.

In the case of x=0 shown in FIG. 4, the position, width, and height of the new clipping frame are operated from the following equations.

$$x'=0 \text{ (because the clipping frame contacts the left-end side of the image)} \quad (1)$$

$$w'=w \times x0/x1 \quad (2)$$

$$h'=h \times w'/w \quad (3)$$

$$y'=y+h \times y0/cHeight-h' \times y1/cHeight \quad (4)$$

On the other hand, in the case of x≠0 shown in FIG. 5, the position, width, and height of the new clipping frame are operated from the following equations.

$$w'=w \ast \ast \ast \quad (5)$$

$$x'=x-(x1-x0) \ni w/cWidth \ast \ast \ast \quad (6)$$

$$y'=y$$

$$h'=h$$

As described above, when it is instructed to move an arbitrary point of an image displayed in the image display area among image data, an image movement amount and magnification ratio are calculated in response to the moving instruction. Then, a predetermined area of the image data is displayed in the image display area based on the calculated image movement amount and magnification ratio.

According to this embodiment, when an arbitrary part of an image is designated with a mouse, a pen, or the like and is grasped and dragged while displaying only a print area in a trimming frame, the image is moved to a preferred position and is also magnified as necessary. For instance, when a human object is photographed in the center area of an image and it is intended to bring the human object near to a right-hand end through trimming, it has conventionally been required to first magnify the image and then move the magnified image. According to this embodiment, however, merely by dragging a part of the human object to a position at which it is desired to be arranged, the human object is moved and is also magnified as necessary. As a result, it becomes possible to obtain an image having preferable composition through a single operation.

Second Embodiment

Figure 7:
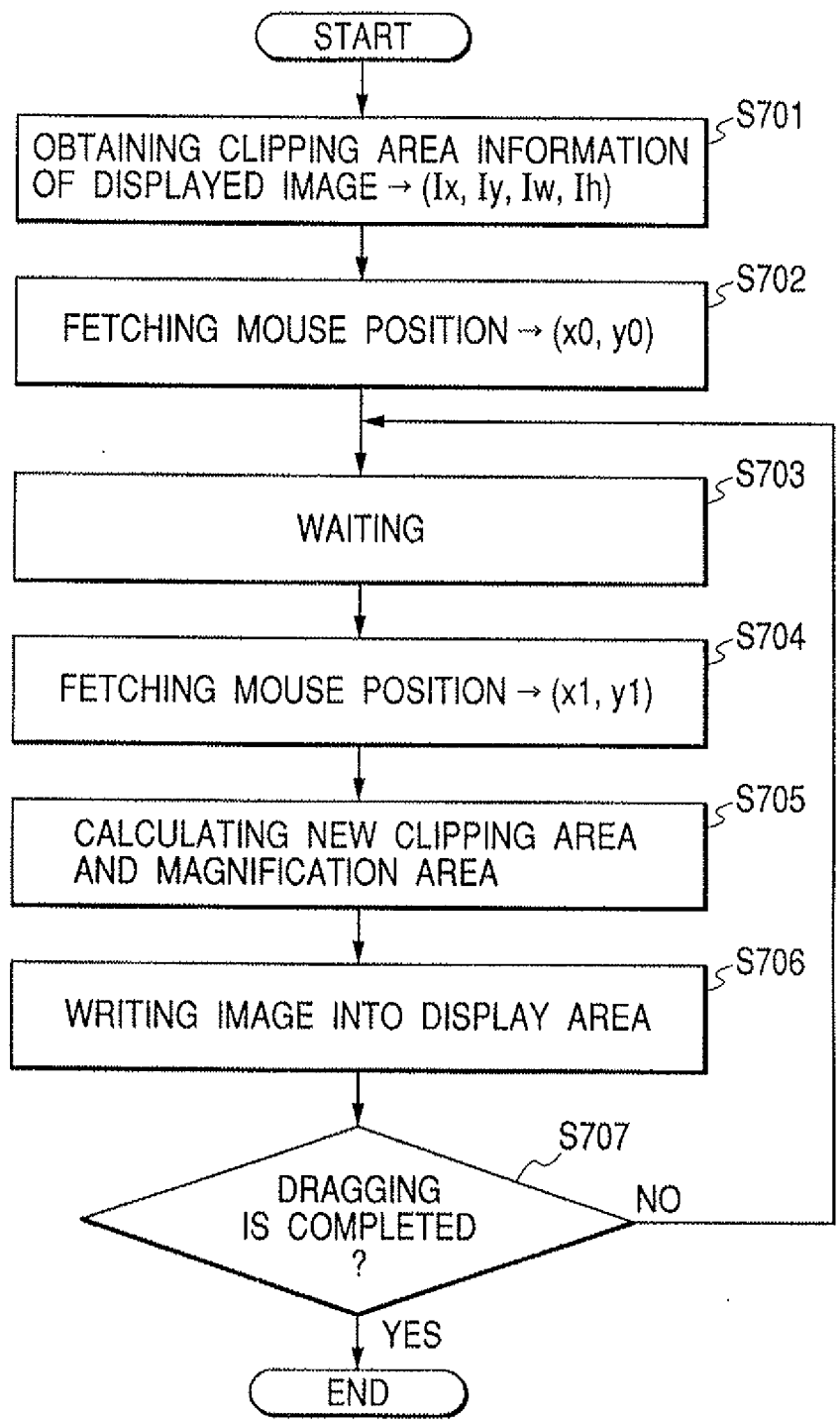
FIG. 7 is a flowchart of a process performed with an image editing method according to the second embodiment.

FIG. 7 is a flowchart showing a process performed with an image editing method according to a second embodiment of the present invention. Hereinafter, the second embodiment of the present invention will be described by following this flowchart. When a dragging operation with the mouse is performed, the following process is started.

In step S701, the position (Ix, Iy), width Iw, and height Ih of the clipping frame (trimming frame) on the image coordinate system at that point in time are obtained. In the same manner as in the first embodiment, the position of the upper left-hand point of the clipping frame on the image coordinate system is substituted into (Ix, Iy) and the width and height of the clipping frame thereon are substituted into (Iw, Ih).

In step S702, the coordinate of the pre-movement position of the mouse on the display memory coordinate system is fetched and is substituted into (x0, y0).

In step S703, a waiting operation is performed for a given length of time preset in order to capture movement of the mouse.

In step S704, the coordinate of the post-movement position of the mouse on the display memory coordinate system is fetched and is substituted into (x1, y1).

In step S705, the position (x', y'), width w', and height h' of the new clipping frame are operated and a magnification ratio is also operated. A method of calculating x', y', w', and h' is basically the same as that of the first embodiment. Detailed description thereof will be made later.

In step S706, an image in the new clipping frame designated by x', y', w', and h' obtained in step S705 is read out and is written onto the display memory coordinate system at the obtained magnification ratio. As a result, an image is displayed on the display.

In step S707, it is judged whether or not the mouse dragging is completed. If the mouse dragging is completed, the process is ended; if not, the process returns to step S703. The step, to which the process returns, is a clear difference from the first embodiment. In the first embodiment, the process returns to the first step S201.

In step S705 of the second embodiment (see FIG. 7), a new clipping frame is always calculated using the initial clipping frame information "Ix, Iy, Iw, and Ih" and mouse position (x0, y0) obtained in steps S701 and S702 when the moving instruction was started. In contrast, in step S205 of the first embodiment (see FIG. 2), a new clipping frame is calculated using the latest clipping frame information "Ix, Iy, Iw, and Ih" and mouse position (x0, y0) obtained in steps S201 and S202 during the dragging (movement instruction).

As shown in FIG. 4, the first embodiment and the second embodiment are the same in that when dragging from the display coordinate (x0, y0) to (x1, y1) is performed, the clipping frame 405 is changed into the clipping frame 407. However, when a dragging operation is performed afterward in order to return to the display coordinate (x0, y0) from (x1, y1), the second embodiment differs from the first embodiment.

Figure 9:
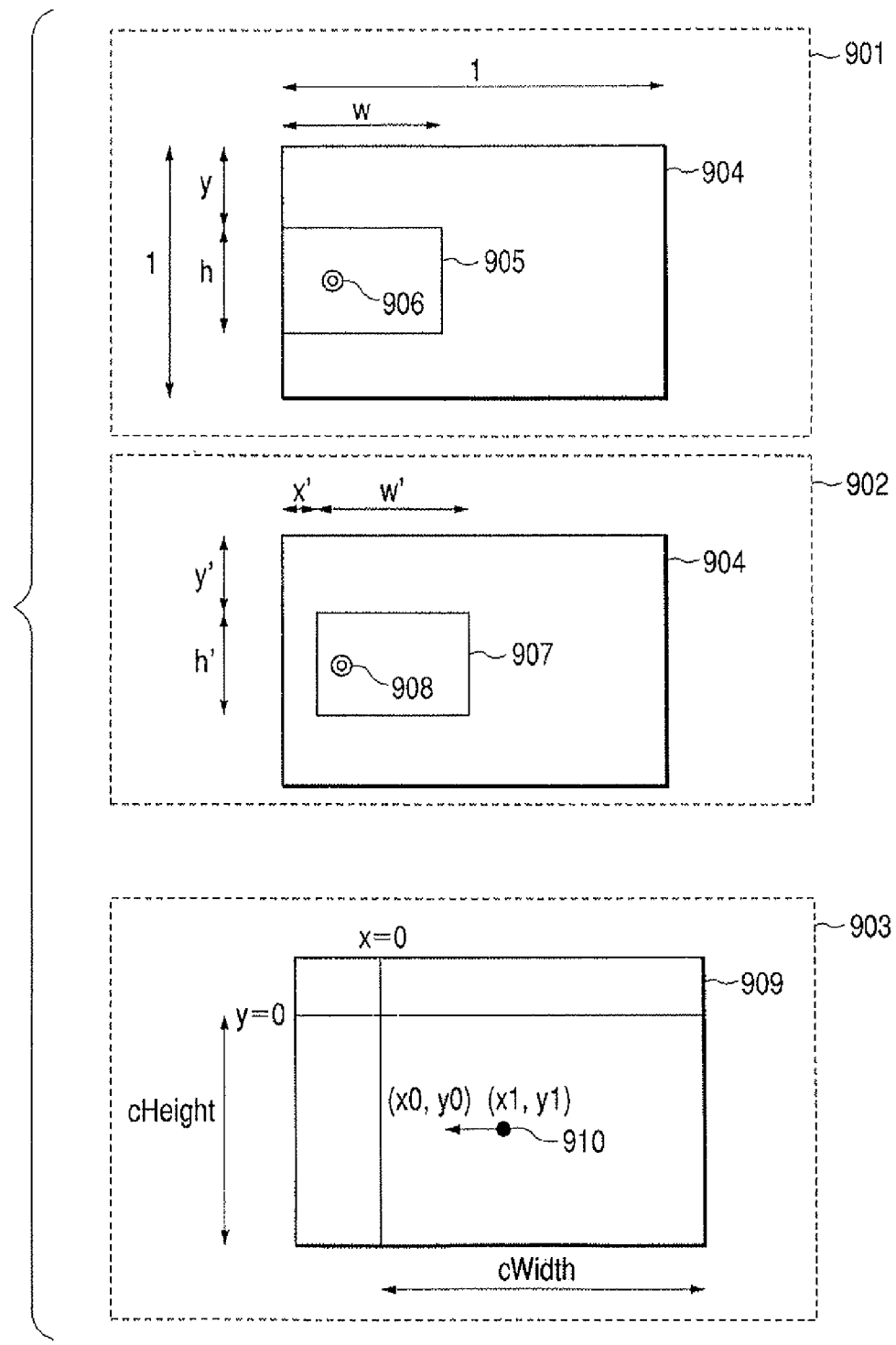
FIG. 9 shows an image coordinate system and a display memory coordinate system according to the second embodiment.

As shown in FIG. 9, in the first embodiment, when dragging from the display coordinate (x1, y1) to (x0, y0) is performed (see reference numeral 910), a trimming frame 905 is changed into a trimming frame 907. That is, only the leftward movement of the dragged main object is performed without changing the magnification ratio (image size).

In contrast, in the second embodiment, the trimming frame 407 shown in FIG. 4 returns to the original trimming frame 405. That is, if dragging is performed on the display coordinate system from (x0, y0) to (x1, y1) and then from (x1, y1) to (x0, y0), the trimming frame changes from the trimming frame 405 to the trimming frame 407 and then from the trimming frame 407 to the trimming frame 405. That is, reversibility is attained in the second embodiment, while such reversibility does not exist in the first embodiment.

According to the second embodiment described above, when an arbitrary part of an image is designated with a mouse, a pen, or the like and is grasped and dragged while displaying only a print area in a trimming frame, the image is moved to a preferred position and is also magnified as necessary. In addition, when the moving direction of the mouse is reversed during a series of dragging operations, the image is reduced while regarding a state at the start of the dragging as a limit. As a result, when the image becomes too large because the mouse is moved more than necessary, it is possible to move the mouse in a reserve direction to thereby return the magnified image to its original image size.

Third Embodiment

Figure 3:
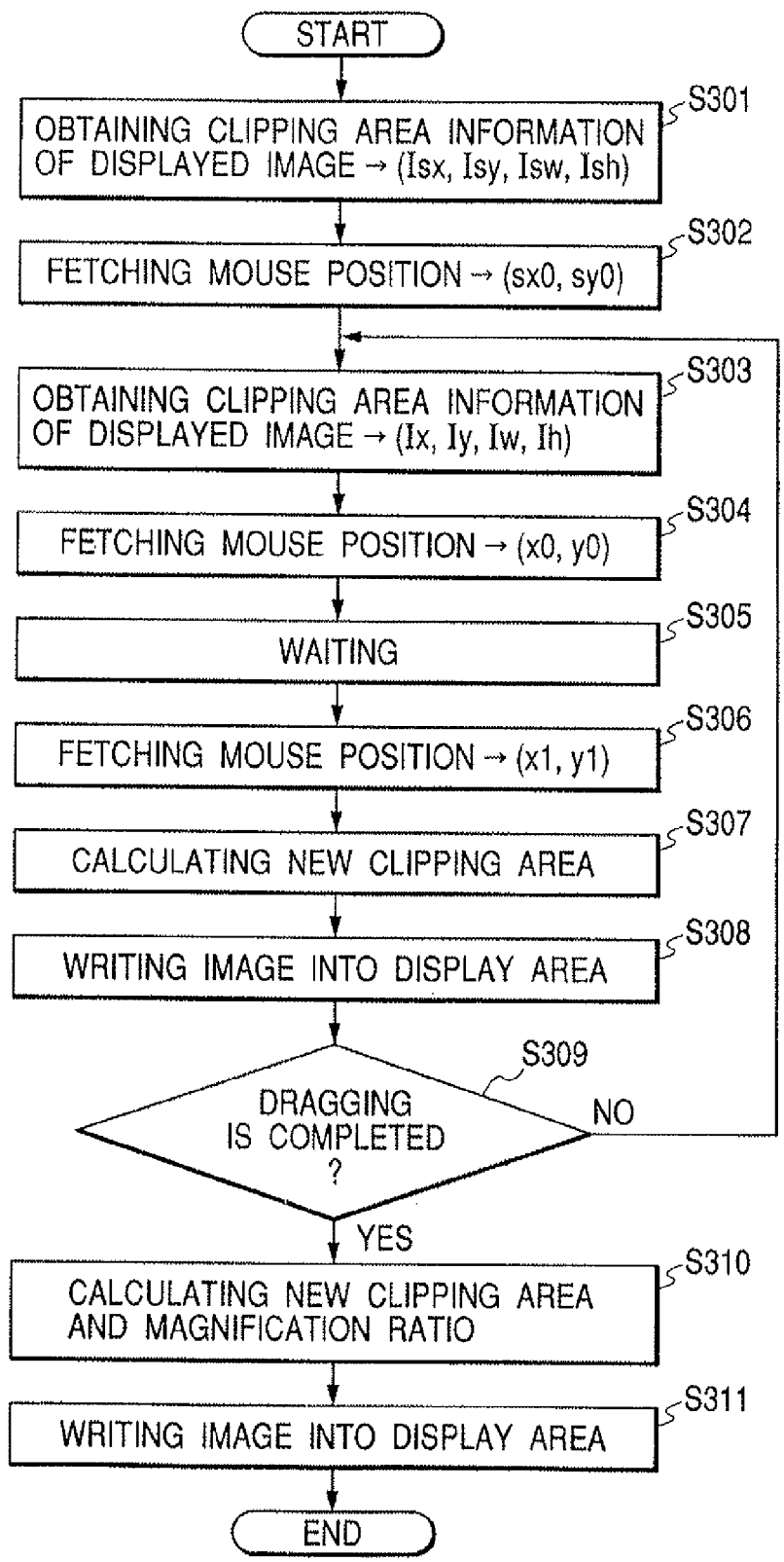
FIG. 3 is a flowchart of a process performed with an image editing method according to the third embodiment.

FIG. 3 is a flowchart showing a process performed with an image editing method according to a third embodiment of the present invention. Hereinafter, the third embodiment of the present invention will be described by following this flowchart. When a dragging operation with the mouse is performed, the following process is started.

In step S301, the position, width, and height of the clipping frame (trimming frame) on the image coordinate system under an initial state are obtained. The position of the upper left-hand point of the clipping frame on the image coordinate system is set as (Isx, Isy) and the width and height of the clipping frame thereon are set as (Isw, Ish).

In step S302, the coordinate (sx0, sy0) of the pre-movement position of the mouse on the display memory coordinate system is fetched.

In step S303, the position, width, and height of the clipping frame on the image coordinate system at that point in time are obtained. That is, the position of the upper left-hand point of the clipping frame on the image coordinate system is substituted into (Ix, Iy) and the width and height of the clipping frame thereon are substituted into (Iw, Ih).

In step S304, the coordinate of the pre-movement position of the mouse on the display memory coordinate system is fetched and is substituted into (x0, y0).

In step S305, a waiting operation is performed for a predetermined length of time preset in order to grasp movement of the mouse.

In step S306, the coordinate of the pre-movement position of the mouse on the display memory coordinate system is fetched and is substituted into (x1, y1). In step S307, the position (x', y'), width w', and height h' of the new clipping frame are operated. A method of calculating x', y', w', and h' will be described later. However, the magnification ratio is not calculated.

In step S308, an image in the new clipping frame designated by x', y', w', and h' obtained in step S307 is read out and written onto the display memory coordinate system. A difference from the first embodiment is that the image is displayed on the display without being magnified at this point in time. This displaying will be described later with reference to FIG. 8.

In step S309, it is judged whether or not the mouse dragging is completed. If the mouse dragging is completed, the process proceeds to step S310; if not, the process returns to step S303.

In step S310, the position (x', y'), width w', and height h' of the new clipping frame are operated and a magnification ratio is also operated. A method used to calculate x', y', w', and h' is the same as that used in the first and second embodiments. At this time, the clipping area information (Isx, Isy, Isw, Ish) and the mouse position information (sx0, sy0) obtained under an initial state in step S301 and S302 are used as an original clipping area.

In step S311, an image in the new clipping frame designated by x', y', w', and h' obtained in step S310 is read out and is written onto the display memory coordinate system at the obtained magnification ratio. This display method is the same as that shown in FIGS. 4 and 5.

Figure 8:
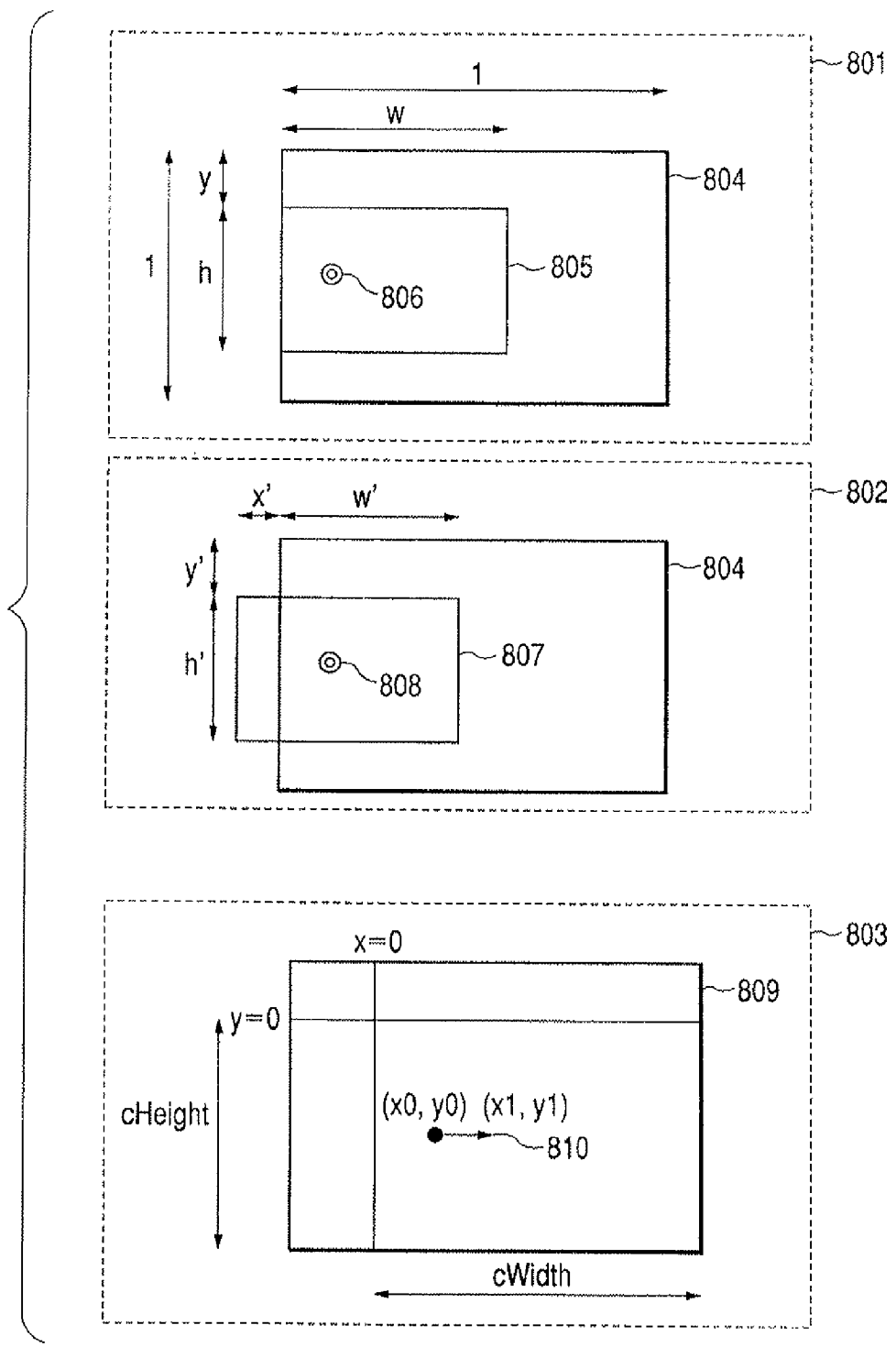
FIG. 8 shows an image coordinate system and a display memory coordinate system.

FIG. 8 shows a display method used in step S308 described above. A case where a user moves a mouse pointer from a display coordinate (x0, y0) to (x1, y1) while performing dragging on a display coordinate system 803 will be described. At this time, the user performs a dragging operation by keeping the left button of the mouse pressed down. A pre-movement image coordinate system 801 shows a trimming frame 805 and a mouse position 806 obtained in steps S303 and S304. A post-movement image coordinate system 802 indicates a trimming frame 807 and a mouse position 808 obtained in steps S306 and S307. That is, in step S308 in which the dragging operation is not yet completed, only image movement is performed based on the mouse movement and magnification (reduction) is not performed. The post-movement trimming frame 807 extends out from an image outer edge 804 and contains an area having no image data. This area without any image data is displayed on the display as white data, for instance. Then, after the dragging operation is completed, the process proceeds to step S311 in which the image is moved and magnified in accordance with the dragging as in the first and second embodiments.

Next, a method used in step S307 to calculate the post-movement image coordinate system 802 will be described. In more detail, a method of calculating the position (x', y'), width w', and height h' of the trimming frame 807 will be described. Note that for ease of explanation, in this embodiment, a case where the mouse is horizontally moved from the left to the right, that is, moved in the forward direction of the x-axis will be described. However, even if the mouse is moved in a reverse direction, a top-to-bottom direction, or an inclined direction, the calculation is possible with the same method.

$x' = x0 - x1$ $y' = y$ $w' = w$ $h' = h$

As described above, while it is instructed to move an image through dragging, image data is displayed based on a calculated image movement amount without being changed in image size. When the image moving through dragging is completed and a dropping operation is performed, the image data is displayed based on a calculated magnification ratio as well as image movement amount.

According to this embodiment, when an arbitrary part of an image is designated with a mouse, a pen, or the like and is grasped and dragged while displaying only a print area in a trimming frame, the image is moved without being changed in image size during continuation of the dragging and is magnified as necessary when a dropping operation is performed at a preferred position. As a result, it becomes possible to realize an easy-to-understand operation where an image is first moved and then is magnified.

Each of the embodiments described above may be realized through execution of a program by a computer. Also, a means for supplying the program to the computer, such as a computer-readable recording medium like a CD-R on which the program has been recorded or a transmission medium like the Internet for transmitting the program, is applicable as a modification of the present invention. Further, a program product, such as a computer-readable recording medium on which the program has been recorded, is applicable as another modification of the present invention. The program, recording medium, transmission medium, and program product described above are contained in the scope of the present invention. As the recording medium, it is possible to use a flexible disk, a hard disk, an optical disk, a magneto-optical disk, a CD-ROM, a magnetic tape, a non-volatile memory card, or a ROM, for instance.

It should be noted here that each embodiment described above is merely a concrete example, in which the present invention is carried out, and therefore it should not be construed that the technical scope of the present invention is limited by these embodiments. That is, it is possible to carry out the present invention in various other forms without departing from the technical idea or major features of the present invention.

As described above, when it is instructed to move an arbitrary point of an image in an image display area, the image is moved to a designated position and is also magnified as necessary. For instance, when it is intended to bring a human object photographed in a center area of an image near to a right-hand end, it is possible to obtain an image having preferable composition by performing desired movement and magnification through a single human object moving operation. Also, while it is instructed to move the human object, image data is successively displayed based on a calculated image movement amount and/or magnification ratio, so that it becomes possible for a user to perform trimming while grasping post-editing composition.

Fourth Embodiment

Figure 14:
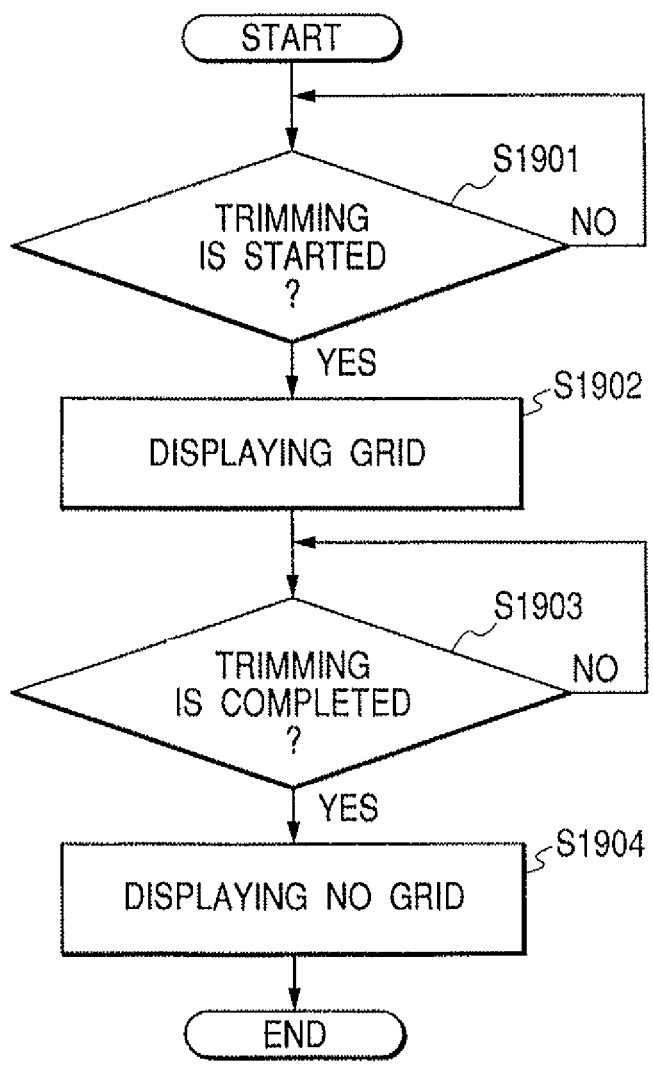
FIG. 14 is a flowchart of a process performed in a fourth embodiment to display a grid.

Next, a fourth embodiment of the present invention whose arrangement is the same as FIG. 1 will be described. FIG. 14 is a flowchart showing a process performed in this embodiment to display a grid on an image that is a target of trimming. In step S1901, it is judged whether or not trimming is started. If a result of this judgment is affirmative, a trimming mode is set, so that the process proceeds to step S1902. On the other hand, if the judgment result is negative, the process returns to step S1901. In step S1902, a grid 1005 (see FIG. 15B) indicating a suited position of a main object in an image is displayed on the screen. This grid 1005 is displayed on the image that is the trimming target, and is a mark suggesting a suited framing (composition) with regard to the position of the main object in the image.

Following this, the process proceeds to step S1903 in which it is judged whether or not the trimming is completed. If a result of this judgment is affirmative, the process proceeds to step S1904 in which the grid 1005 is hidden; if not, the process returns to step S1903.

Figure 15A:
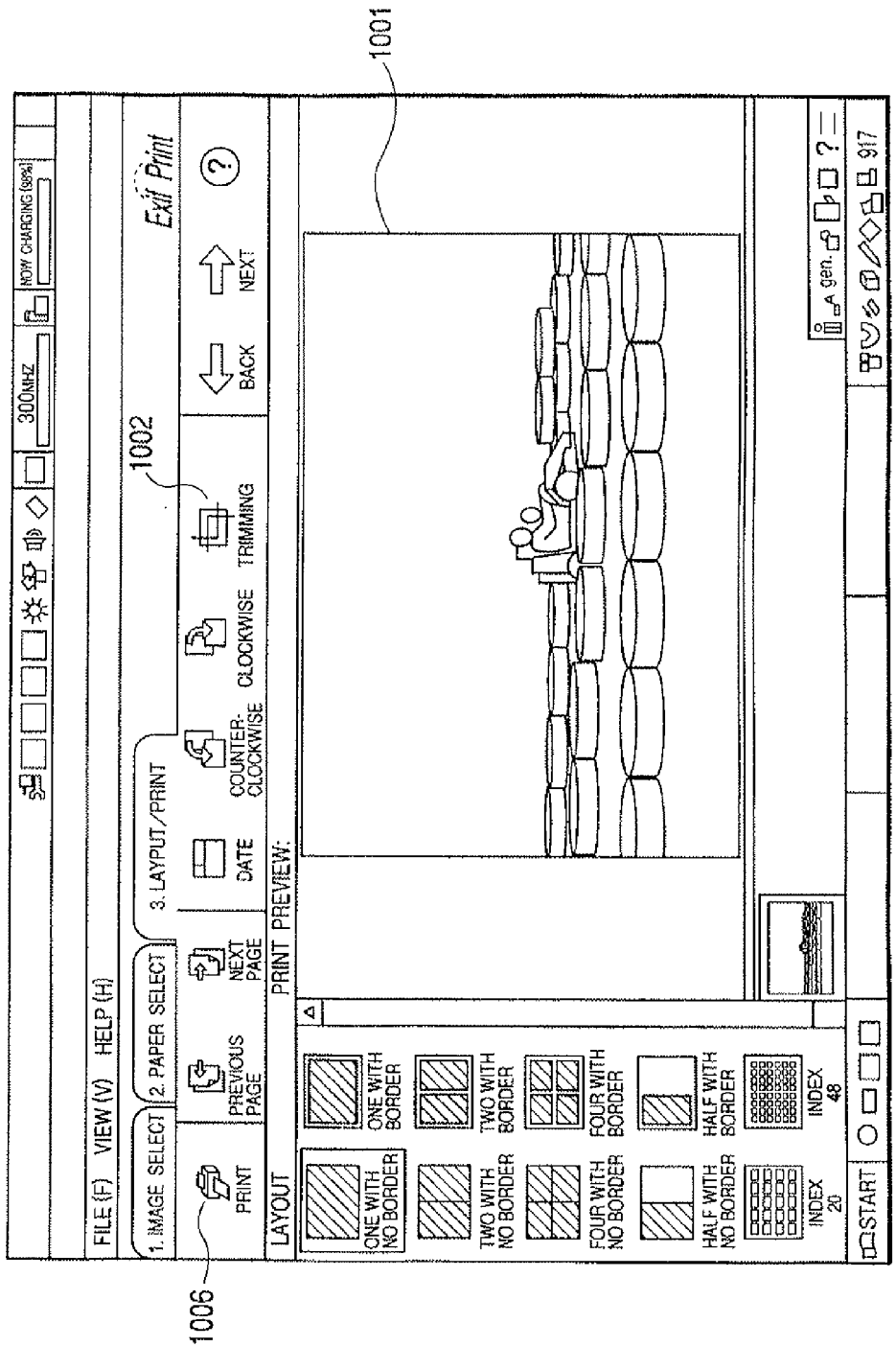
FIGS. 15A and 15B show an example of a trimming process according to the fourth embodiment.
Figure 15B:
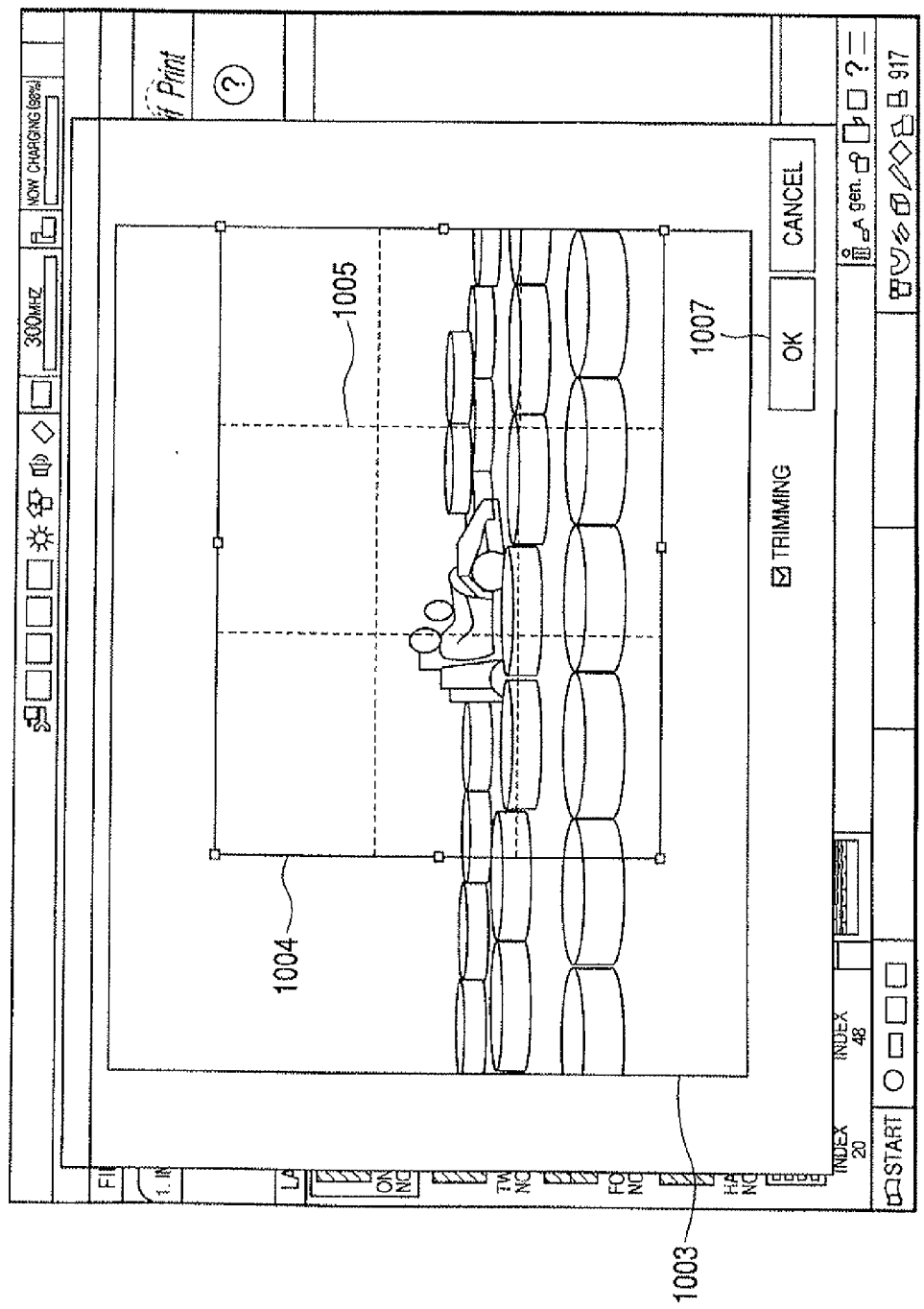

How a user interface changes will be described by following the flowchart shown in FIG. 14 with reference to FIGS. 15A and 15B. FIG. 15A shows a screen displayed immediately before printing is executed, with a pre-trimming image 1001 being displayed thereon. Here, when a trimming button 1002 is pushed, a trimming window shown in FIG. 15B is opened in which an image 1003 is displayed. In this example, the pushing of the trimming button 1002 corresponds to the affirmative result "YES" of the trimming start judgment in step S1901. In the trimming window shown in FIG. 15B, a trimming frame 1004 is displayed, and when one of the four corners or four sides of the trimming frame 1004 is dragged with the mouse, the size and/or position of the trimming frame 1004 are/is changed. Reference numeral 1005 denotes a grid that is displayed in the trimming frame 1004 in order to indicate a suited position of the main object. When the trimming is completed, the user pushes an OK button 1007. This pushing of the OK button 1007 corresponds to step S1903. By changing the size and/or position of the trimming frame 1004, the size and/or position of the image in the trimming frame 1004 that is the target of the trimming are changed.

In this embodiment, the trimming is performed using the window shown in FIG. 15B dedicated to the trimming, so that there arises no problem even if the grid 1005 is displayed in this window at all times. The grid 1005 is changed along with changing of the position and/or size of the trimming frame 1004, although a relative position in the trimming frame 1004 is not changed. Also, a button for selecting displaying/non-displaying of the grid may be provided in the window shown in FIG. 15B and switching between displaying and non-displaying of the grid may be performed in accordance with the on/off of this button.

After the trimming, the user pushes a print button 1006 shown in FIG. 15A to thereby instruct to print the image in the trimming frame 1004. The image data, whose printing has been instructed, is outputted to the printer 109 (see FIG. 1), which then prints the image data.

It is preferable that the grid 1005 described above is a grid in which the image within the trimming frame 1004 is divided under a "golden section" rule. It is generally said that if a main object is positioned at any one of the intersections of this grid 1005, a suited composition is obtained. This golden section will be described below. A "golden ratio" based on the golden section means a "harmonic and beautiful ratio" considered by ancient people.

A division method, with which a condition of "AB:BP=BP:AP" is satisfied as shown in FIG. 11A, is called the golden section and a rectangle where the radio of a long side to a short side is "AB:BP=BP:AP (1:0.618)" is well known for instance. Generally, it is also said that a shape having this ratio gives the most comfortable feeling to humans.

Next, how the golden ratio is obtained with precision will be described with reference to FIG. 11B. First, there will be considered a "rectangle where when a square is clipped from the rectangle, a remaining rectangle becomes similar to the original rectangle". That is, the following equation is satisfied.

$$1:(x+1)=x:1$$

Therefore, the following equation is satisfied.

$$X^2+x-1=0$$

When this equation is solved, the side EC becomes as follows.

$$EC=X=\{(\ )-1\}/2=0.618 * * *$$

Also, the side AD becomes as follows.

$$AD=x+1=[\{(\ )-1\}/2]+1=\{(\ )+1\}/2=1.618 * * *$$

In this case, "x" and "(x+1)" are in a mutually reciprocal relation and are both called the golden ratio.

When the composition of a photograph is determined, it is possible to use this golden ratio. In FIG. 11C, a straight line is drawn between interior-division points of the vertical sides at the golden ratio (0.618:1), another straight line is drawn between interior-division points of the horizontal sides at the golden ratio (0.618:1), and an intersection between these lines is set as a golden section point 301. When vertically and horizontally symmetrical points are considered, four golden section points are obtained in total.

Meanwhile, in the photograph world, although not so strict as the golden section described above, a division rule for obtaining an image felt by humans as beautiful is called the golden section. Golden section points (grid points) are obtained with a three-division method shown in FIG. 16A or a diagonal method shown in FIG. 16B, and are used as a guide for creating preferable composition.

Figure 16A:
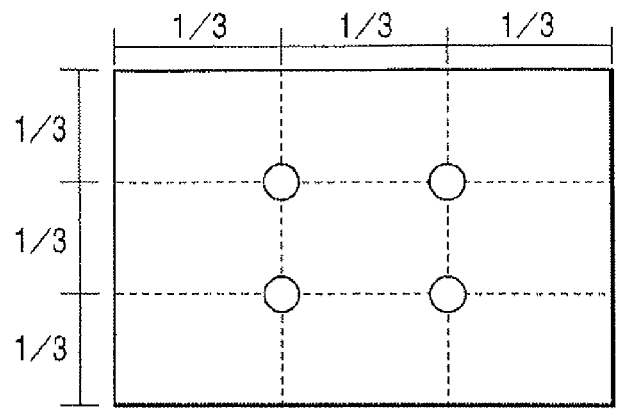
FIGS. 16A, 16B, and 16C each show an example of a grid displayed according to the fourth embodiment in order to indicate the suited position of a main object.
Figure 16B:
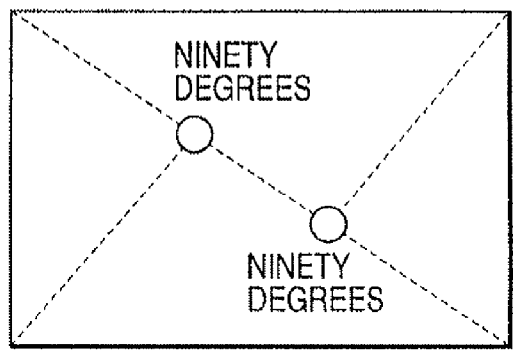
Figure 16C:
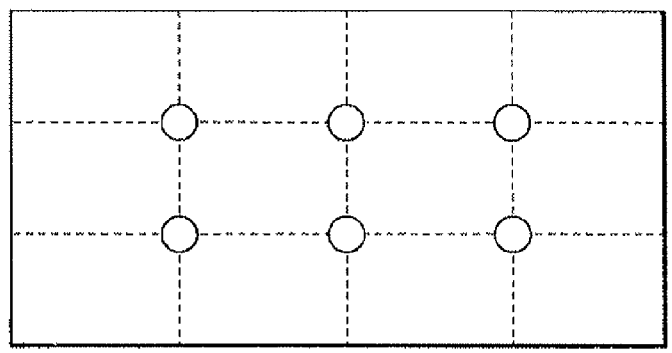

FIG. 16A shows a grid based on the three-division method with which each of the vertical sides and the horizontal sides of a rectangle is divided equally into three, straight lines are drawn between the division points, and four intersections thereof are each set as a grid point. On the other hand, FIG. 16B shows a grid based on the diagonal method with which a diagonal line is drawn in a rectangle, perpendicular lines are drawn from two remaining vertexes of the rectangle to the diagonal line, and intersections between the diagonal line and the perpendicular lines are each set as a grid point. Also, as a modification of the grid shown in FIG. 16B, four grid points may be provided by drawing two diagonal lines in a rectangle and drawing perpendicular lines to each diagonal line from remaining vertexes not existing on each diagonal line. Further, in the case of the P (panorama) type of an APS (Advanced Photo System) camera, there may be used a method with which a rectangle is horizontally divided equally into four or five. If a rectangle is vertically divided into three and is horizontally divided into four as shown in FIG. 16C, six grid points are obtained. As described above, the grid points indicate suited positions of a main object with reference to the aspect ratio of an image, and each grid point exists at a screen division ratio called the golden ratio.

Figure 17A:
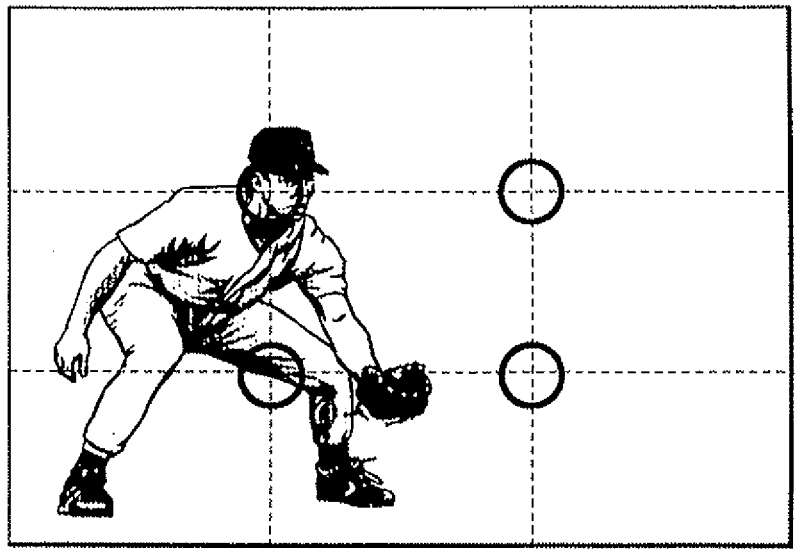
FIGS. 17A and 17B each show an example in which trimming is performed using the grid according to the fourth embodiment.
Figure 17B:
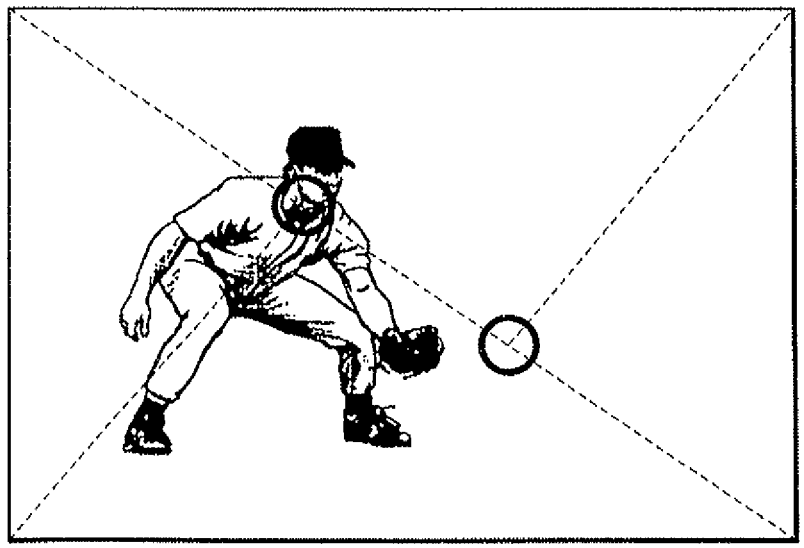

FIG. 17A shows an example in which trimming is performed using the grid shown in FIG. 16A, while FIG. 17B shows an example in which trimming is performed using the grid shown in FIG. 16B. It is possible for a user to create an image having appropriate composition by positioning a human object that is the main object at any one of the grid points through trimming. Note that only the grid points may be displayed or other marks may be displayed which suggest appropriate positions of the main object in the image.

According to this embodiment, appropriate positions of a main object are indicated by a grid or the like on a screen on which trimming is performed. As a result, it becomes possible even for an inexperienced user to obtain an image having appropriate composition.

Fifth Embodiment

Next, a fifth embodiment of the present invention will be described. In the fourth embodiment described above, the size and/or position of the trimming frame 1004 (see FIG. 15B) are/is adjusted. In this fifth embodiment, however, there will be described a case where an image to be obtained finally is displayed and a trimming area is determined by changing the size and/or position of the displayed image. In this case, the trimming frame and the grid are fixedly displayed.

Figure 12:
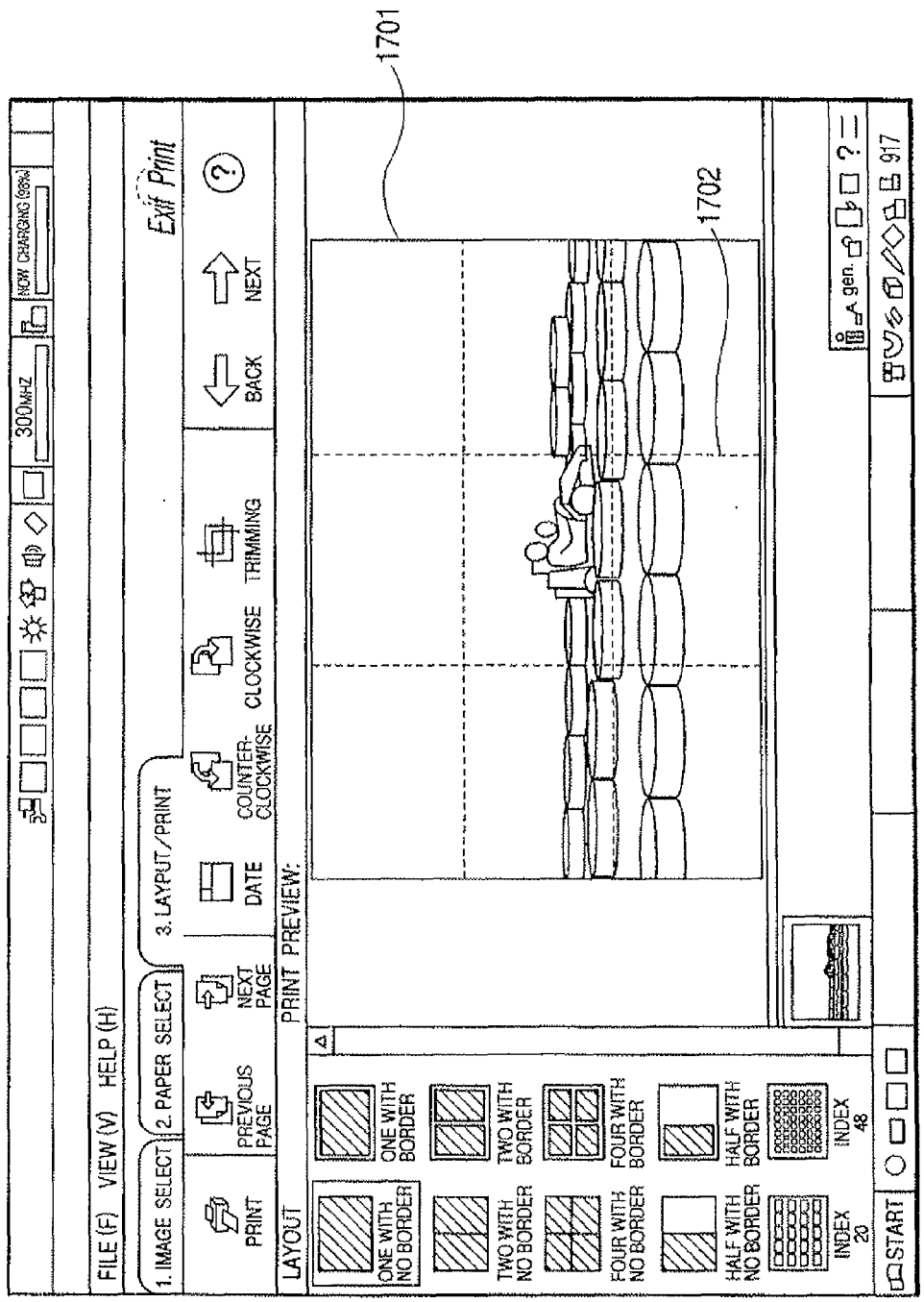
FIG. 12 shows a grid displayed according to the fifth embodiment.
Figure 13:
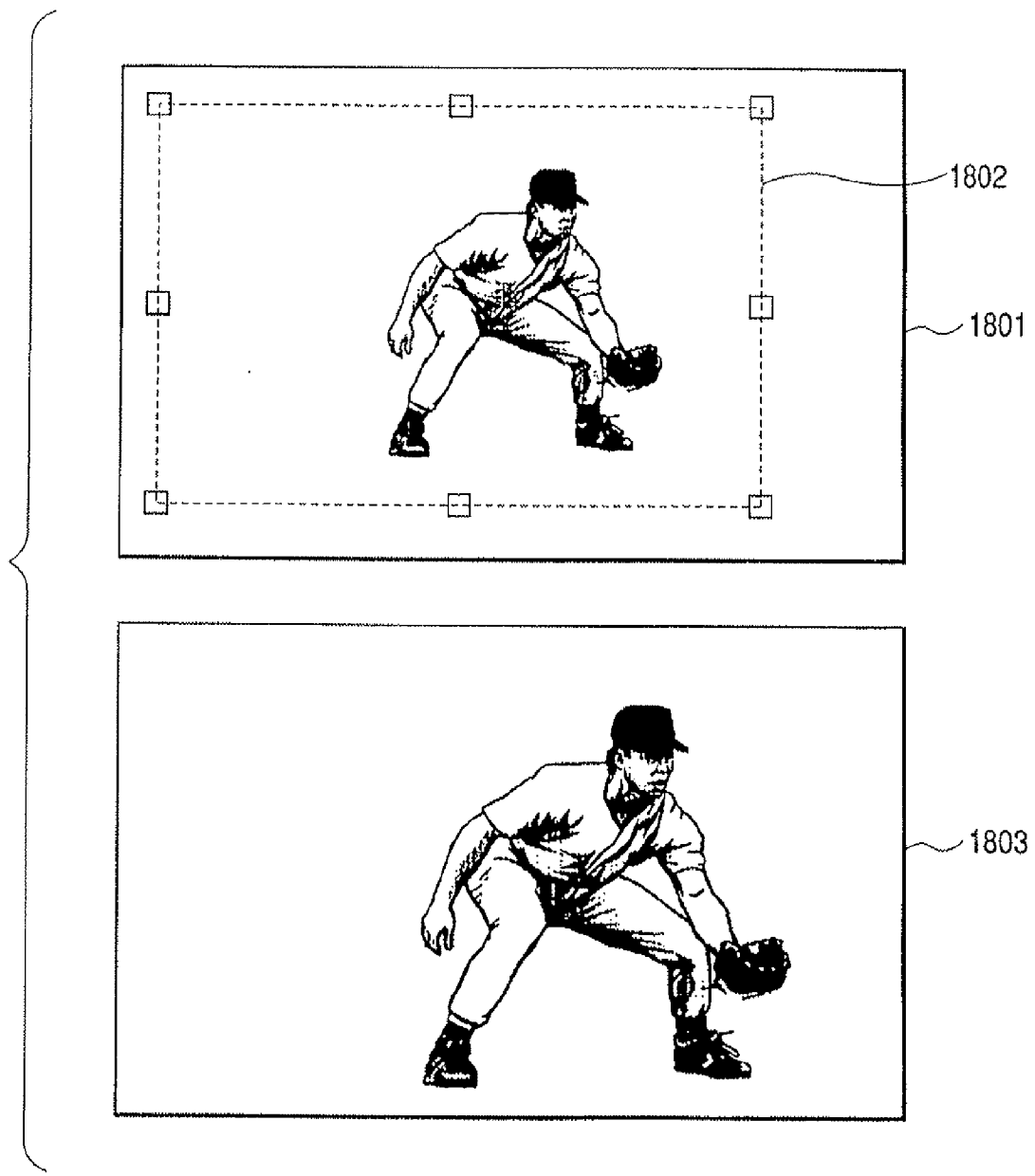
FIG. 13 shows an example of a trimming process.

In this embodiment, a grid is displayed on the image 1001 shown in FIG. 15A, an example of which is shown in FIG. 12. In FIG. 12, a grid 1702 is displayed on an image 1701. The size and position of this grid 1702 are fixed and the image 1701 is magnified and/or moved so that a main object is positioned at a grid point. In this manner, trimming is performed and an image having appropriate composition is obtained. Note that the display area frame of the image 1701 and the size and position of the grid 1702 are fixed.

During a trimming operation in this case, an original image in a predetermined display area is magnified and moved to thereby display a desired part of the original image in the display area in a desired size and print it.

An image editing method for performing magnification and/or movement of an image through a single operation will be described below. When it is intended to move a given part of an original image that is not yet trimmed, it is necessary to perform a magnification process in order to prevent a situation where a margin is generated. The following is a description of a technique of specifying an image clipping area by obtaining a magnification ratio required to move a selected part. By combining this method with the grid displaying described above, it becomes possible to easily arrange a main object at the most suited position in a photograph.

In this embodiment, two coordinate systems are used which are the display memory coordinate system for displaying an image on the display 106 and the image coordinate system for expressing a position on image data. With those coordinate systems, an area that should be clipped from the image data after the mouse 108 is moved, a magnification ratio at the time of writing for displaying on the display 106 are determined, and writing into a display memory area is finally performed.

The display memory coordinate system, the image coordinate system, the movement of the trimming frame, and the frame magnification/reduction process at the time of movement of the trimming frame are the same as those described in the first embodiment with reference to FIGS. 4 and 5, and therefore the description thereof is omitted in this embodiment.

Figure 10:
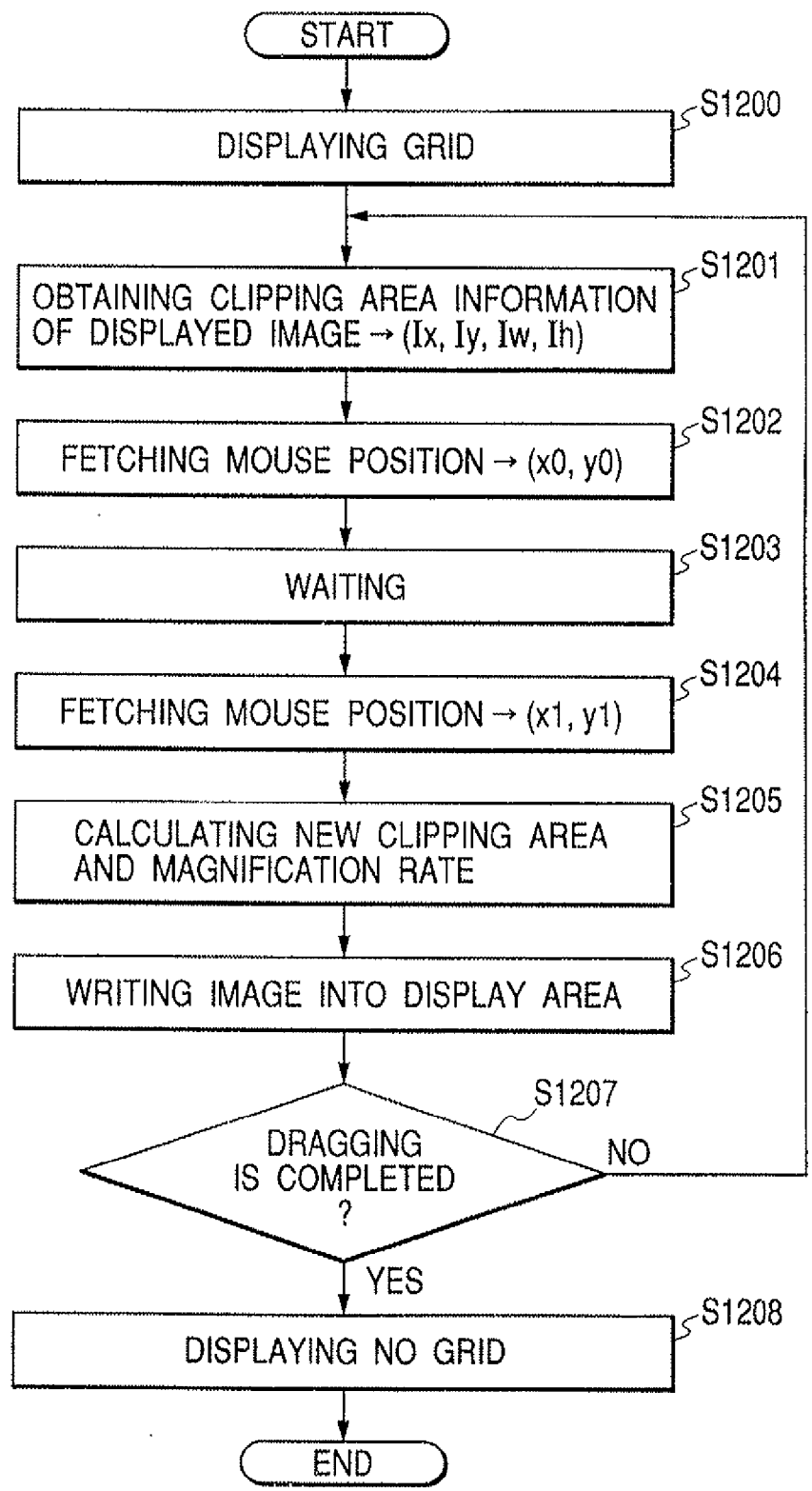
FIG. 10 is a flowchart of a process performed with an image editing method according to a fifth embodiment.

FIG. 10 is a flowchart of a process performed with an image editing (trimming) method according to the fifth embodiment of the present invention. Hereinafter, the fifth embodiment of the present invention will be described by following the flowchart. When a dragging operation with the mouse is performed, the following process is started.

In step S1200, the grid 1702 (see FIG. 12) is displayed.

In step S1201, the position (Ix, Iy), width Iw, and height Ih of the clipping frame (trimming frame) on the image coordinate system at that point in time are obtained. That is, as shown in FIGS. 4 and 5, the position of an upper left-hand point of the image outer edge 404/504 is set as (0, 0), the position of an upper left-hand point of the clipping frame 405/505 on the image coordinate system is substituted into (Ix, Iy), and the width and height of the clipping frame 405/505 are substituted into (Iw, Ih).

In step S1202, the position coordinate of the mouse before movement on the display memory coordinate system is started is fetched and is substituted into (x0, y0).

In step S1203, a waiting operation is performed for a given length of time preset in order to grasp the movement of the mouse.

In step S1204, the position coordinate of the mouse after the movement on the display memory coordinate system is fetched and is substituted into (x1, y1).

In step S1205, as shown in FIGS. 4 and 5, the position (x', y'), width w', and height h' of the new clipping frame 407/507 are operated and a magnification ratio is also operated. A method of calculating x', y', w', and h' will be described later.

In step S1206, an image within the new clipping frame 407/507 designated by x', y', w', and h' obtained in step S1205 is read out and is written onto the display memory coordinate system at the obtained magnification ratio. As a result, an image is displayed on the display.

In step S1207, it is judged whether or not the mouse dragging is completed. If the mouse dragging is completed, the process is ended; if not, the process returns to step S1201 and the same operations are repeated.

In step S1208, the grid 1702 (see FIG. 12) is hidden.

When the process is ended, a post-trimming image is printed or saved. The clipping frame is an image print area indicating an image area to be printed. When a user instructs to print the image displayed in the clipping frame, the image inside the clipping frame is printed.

By performing the image editing process described above, the main object is moved and/or magnified so as to follow the mouse pointer and is successively displayed during a dragging operation, so that it becomes possible to perform trimming while grasping composition at the time of printing.

Next, a method used in step S1205 to calculate the position (x', y'), width w', and height h' of the new clipping frame will be described. Note that for ease of explanation, in the following description, a case where the mouse is horizontally moved from the left to the right, that is, moved in the forward direction of the x-axis will be described. However, even if the mouse is moved in a reverse direction, a top-to-bottom direction, or an inclined direction, the calculation is possible with the same method.

The method of obtaining the position, width, and height of the new clipping frame will be considered based on two cases of an initial state, one of which is a case of x=0 where a clipping frame 405 contacts an image outer edge 404 as indicated by 401 in FIG. 4 and the other of which is a case of x≠0 where a clipping frame 505 does not contact an image outer edge 504 as indicated by 501 in FIG. 5.

In the case of x=0 shown in FIG. 4, the position, width, and height of the new clipping frame are operated from the following equations.

$$x'=0 \text{ (because the clipping frame contacts a left-end side of the image)} \quad (1)$$

$$w'=w \times x0/x1 \quad (2)$$

$$h'=h \times w'/w \quad (3)$$

$$y'=y+h \times y0/c\text{Height}-h' \times y1/c\text{Height} \quad (4)$$

On the other hand, in the case of x≠0 shown in FIG. 5, the position, width, and height of the new clipping frame are operated from the following equations.

$$w'=w \ast \ast \ast \quad (5)$$

$$x'=x-(x1-x0) \ni w/c\text{Width} \ast \ast \ast \quad (6)$$

$$y'=y$$

$$h'=h$$

A process for magnifying/reducing the image 1701 in FIG. 12 is performed through a combination of a CTRL key of the keyword and the rotation of a wheel of the mouse, and the movement and/or magnification process described above is performed through a combination of pressing the CTRL key of the keyboard 108 and dragging by using the mouse 108. That is, by performing the mouse dragging while keeping the CTRL key pressed down, the movement and/or magnification process described above is performed. Also, it is assumed that the CTRL key is not used at the time of other operations.

If a process in this embodiment is described using the flowchart shown in FIG. 14 related to the fourth embodiment, it is judged in steps S1901 and S1903 whether or not trimming is started or completed with reference to whether the CTRL key is pressed down. That is, while it is detected that the CTRL key is pressed down, it is judged that a trimming operation is performed (trimming mode is set) and therefore the grid is displayed.

Also, at the time of trimming, magnification and movement of an image may be concurrently performed in the manner described above. Alternatively, the movement and the magnification may be separately performed. It is preferable that the grid is displayed when the position or size of an image is changed through trimming.

According to this embodiment, when an arbitrary part of an image is designated with a mouse, a pen, or the like and is grasped and dragged while displaying only a print area in a trimming frame, the image is moved to a preferred position and is also magnified as necessary. For instance, when a human object is photographed in a center area of an image and it is intended to bring the human object near to a left-hand end through trimming, merely by dragging a part of the human object to a position at which it is desired to be arranged, the human object is moved and is also magnified as necessary. As a result, it becomes possible to obtain an image having preferable composition through a single operation. Also, it is possible to move the main object to a preferable position while viewing an image to be finally printed, so that an easy-to-perform operation is realized which can be done by intuition. Further, appropriate positions of the main object are displayed using the grid as a guide, so that it becomes possible even for a beginner to obtain a photograph having favorable composition with ease.

Sixth Embodiment

In a sixth embodiment of the present invention, the grid display method of the fifth embodiment used in step S1902 in FIG. 14 is improved. In the fifth embodiment, one of the grids shown in FIGS. 16A to 16C is displayed in step S1902. In this sixth embodiment, however, the grid to be displayed is changed in accordance with the position at which the mouse pointer currently exits. In this embodiment, the display screen, in which the mouse pointer is capable of moving, is vertically and horizontally divided equally into two, with each part being referred to as an "upper left-hand area", an "upper right-hand area", a "lower left-hand area", and a "lower right-hand area". The mouse pointer indicates the position of the mouse and moves along with the movement of the mouse.

Figure 18:
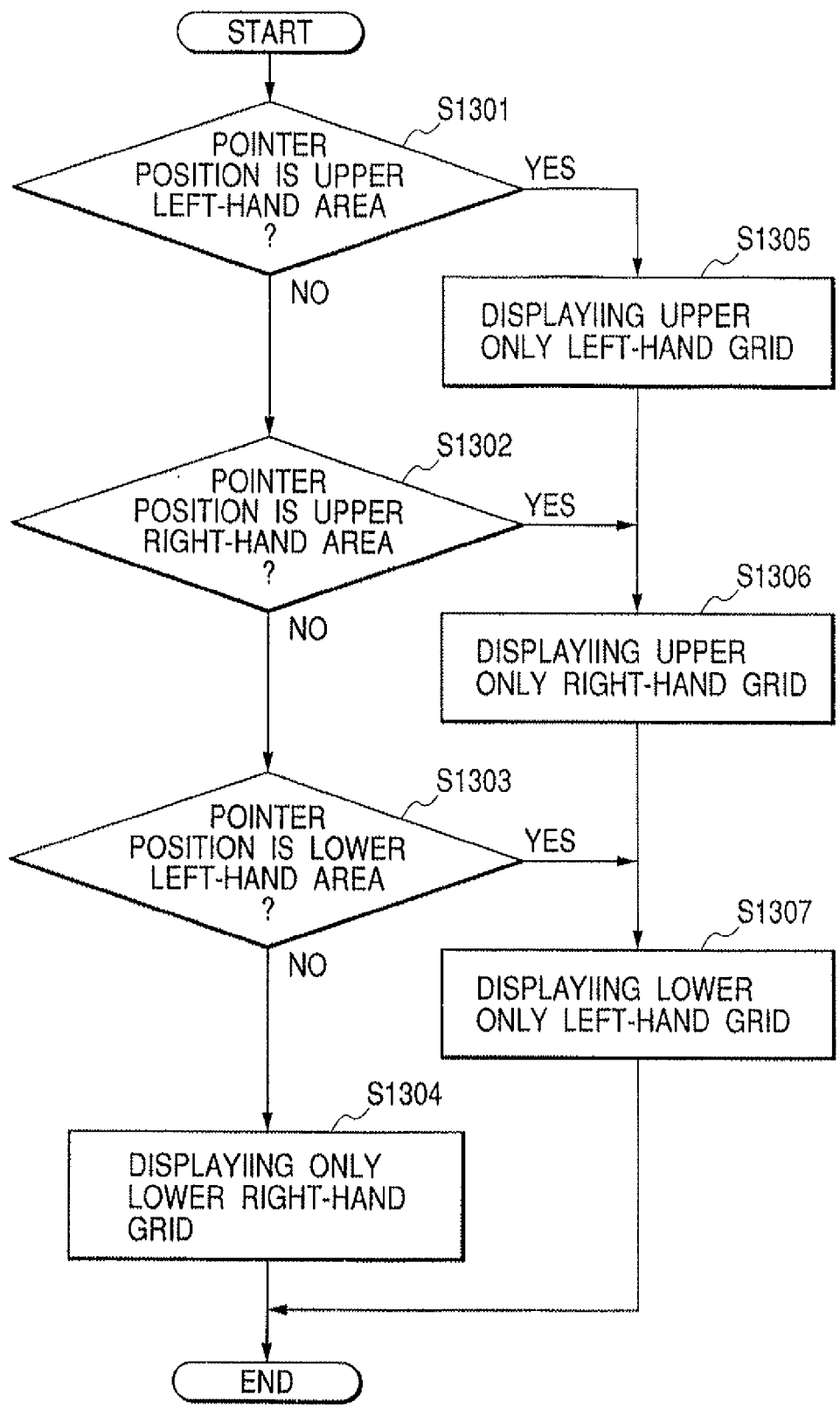
FIG. 18 is a flowchart of a grid display process according to a sixth embodiment.
Figure 19A:
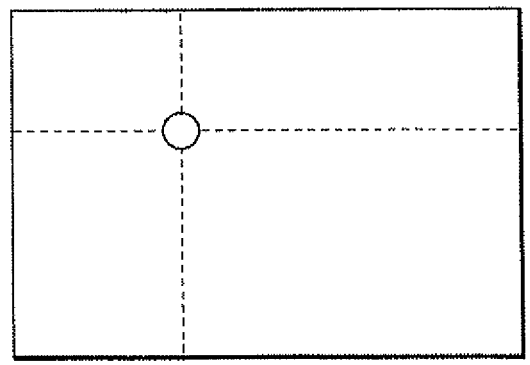
FIGS. 19A, 19B, 19C, and 19D each show an example of a grid displayed according to the sixth embodiment.

FIG. 18 is a flowchart showing a grid display process according to the sixth embodiment. In step S1301, it is judged whether or not the mouse pointer is positioned in the upper left-hand area, and if a result of this judgment is affirmative, the process proceeds to step S1305. In step S1305, as shown in FIG. 19A, only a grid intersecting in the upper left-hand area is displayed. If it is judged in step S1301 that the mouse pointer does not exist in the upper left-hand area, the process proceeds to step S1302.

Figure 19B:
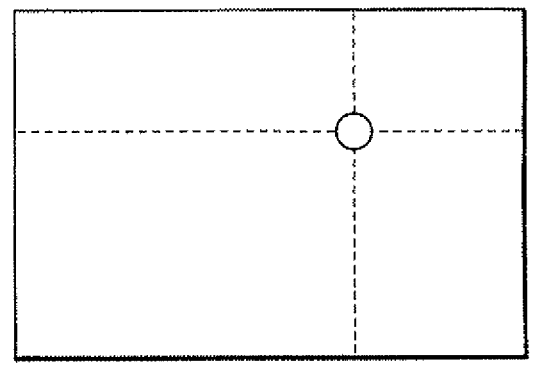

In step S1302, it is judged whether or not the mouse pointer is positioned in the upper right-hand area, and if a result of this judgment is affirmative, the process proceeds to step S1306. In step S1306, as shown in FIG. 19B, only a grid intersecting in the upper right-hand area is displayed. If it is judged in step S1302 that the mouse pointer does not exist in the upper right-hand area, the process proceeds to step S1303.

Figure 19C:
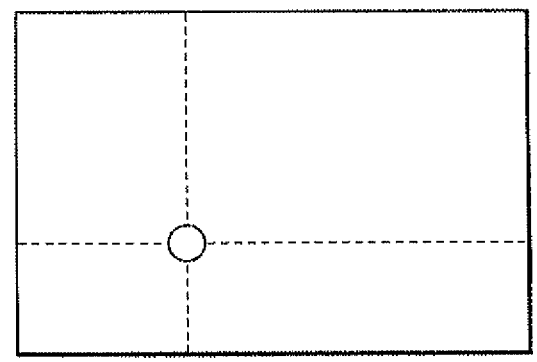

In step S1303, it is judged whether or not the mouse pointer is positioned in the lower left-hand area, and if a result of this judgment is affirmative, the process proceeds to step S1307. In step S1307, as shown in FIG. 19C, only a grid intersecting in the lower left-hand area is displayed. If it is judged in step S1303 that the mouse pointer does not exist in the lower left-hand area, the process proceeds to step S1304.

Figure 19D:
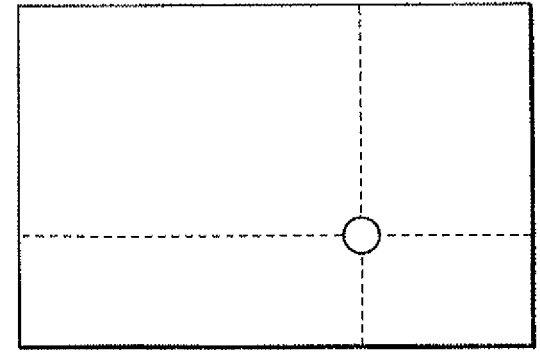

In step S1304, as shown in FIG. 19D, only a grid intersecting in the lower right-hand area is displayed.

When the four grids shown in FIGS. 19A to 19D are combined with each other, the grid shown in FIG. 16A is obtained. When the main object is grasped and moved along with the mouse pointer, only one grid point, out of four grid candidate points, that is closest to the mouse pointer is displayed. As described in the second embodiment, the main object is moved so as to follow the mouse pointer. In this embodiment, only the grid point closest to the mouse pointer is displayed, so that it is possible for a user to grasp one optimum grid point, among the multiple grid candidate points, that is close to the current position of the main object. Also, there is a possibility that the user may be disturbed by a situation where many grid points are simultaneously displayed. In view of this problem, only one grid point is displayed at a time, thereby realizing a simple display screen.

It should be noted here that the color and size of the closest grid may be changed from those of other grids, for instance. In this case, an effect is provided in that easy-to-view and convenient displaying is performed.

According to this embodiment, when a user drags a main object with a mouse while keeping the CTRL key pressed down, only a nearby main object point (grid point) that can give appropriate composition is displayed on a screen in accordance with an operation for moving the main object. As a result, it becomes possible even for an inexperienced user to perform a trimming process with ease.

Each of the embodiments described above may be realized through execution by a computer (or the CPU 101 in the computer) of a program stored in a storage medium such as the ROM 102, the RAM 103, or the HDD 104. Also, a means for supplying the program to the computer, such as a computer-readable recording medium like a CD-ROM recording this program or a transmission medium such as the Internet for transmitting the program, is applicable as a modification of the present invention. Further, a program product, such as a computer-readable recording medium on which the program has been recorded, is applicable as another modification of the present invention. The program, recording medium, transmission medium, and program product described above are contained in the scope of the present invention. As the recording medium, it is possible to use a flexible disk, a hard disk, an optical disk, a magneto-optical disk, a CD-ROM, a magnetic tape, a non-volatile memory card, or a ROM, for instance.

It should be noted here that each of the embodiments described above is merely a concrete example, in which the present invention is carried out, and therefore it should not be construed that the technical scope of the present invention is limited by those embodiments. That is, it is possible to carry out the present invention in various other forms without departing from the technical idea or major features of the present invention.

As described above, according to the present invention, at the time of trimming an image, an appropriate position of a main object in an image is indicated by a grid or the like. As a result, it becomes possible even for an inexperienced user to obtain an image having suited composition through trimming.

The present invention is not limited to the embodiments described above and it is possible to make various modifications and changes without departing from the scope defined in the appended claims.

What is claimed is:

1. An image editing method comprising the steps of:
   displaying a frame on an image;
   inputting an instruction to move the displayed frame; and
   arithmetically operating a movement amount and a magnification/reduction ratio of the frame in accordance with the instruction input in said input step,
   wherein, if the instruction to move the frame excessively over an end of the image is input in said input step, said arithmetic operation step arithmetically operates the magnification/reduction ratio of the frame in accordance with an excess movement amount over the edge of the image so as to reduce a size of the frame.

2. A method according to claim 1, further comprising a step of displaying the frame based on the movement amount and the magnification ratio arithmetically operated in said arithmetic operation step, by superimposing the frame on the image.

3. A method according to claim 1, further comprising a step of instructing to print an image in the frame.

4. A method according to claim 1, wherein said arithmetic operation step is arranged to arithmetically operate the movement amount and the magnification ratio every predetermined period during a time period from start of the instruction to move the frame to end thereof.

5. An image editing apparatus comprising:
   a display device which displays an image and displays a frame on the image;
   an input device which inputs an instruction to move the displayed frame; and
   a processor which arithmetically operates a movement amount and a magnification ratio of the frame in accordance with the instruction input by said input unit,
   wherein, if the instruction to move the frame excessively over an edge of the image is input by said input device, said processor arithmetically operates the magnification/reduction ratio of the frame in accordance with an excessive movement amount over the edge of the image so as to reduce a size of the frame.

6. An apparatus according to claim 5, wherein the display device displays the frame based on the movement amount and the magnification ratio arithmetically operated by said processor, by superimposing the frame on the image.

7. An apparatus according to claim 5, wherein an instruction is issued to print an image in the frame.

8. An apparatus according to claim 5, wherein said processor is arranged to arithmetically operate the movement amount and the magnification ratio every predetermined period during a time period from start of the instruction to move the frame to end thereof.

9. A non-transitory computer-readable recording medium storing a program comprising a code for causing a computer to execute image editing comprising the steps of:
   displaying a frame on an image;
   inputting an instruction to move the displayed frame; and
   arithmetically operating a movement amount and a magnification/reduction ratio of the frame in accordance with the instruction input in said input step,
   wherein, if the instruction to move the frame excessively over an edge of the image is input in said input step, said arithmetic operation step arithmetically operates the magnification/reduction ratio of the frame in accordance with an excess movement amount over the edge of the image so as to reduce a size of the frame.

10. An image editing method comprising the steps of:
    displaying a frame on an image;
    inputting an instruction to move the displayed frame; and
    controlling a movement amount and a magnification/reduction ratio of the frame in accordance with the instruction input in said input step,
    wherein after the frame reaches an edge of the image, if the instruction to further move the frame to a direction toward the edge of the image is input in said inputting step, said controlling step arithmetically operates the magnification/reduction ratio of the frame in accordance with a movement amount of the frame in the direction toward the edge of the image after the frame reaches the edge of the image so as to reduce a size of the frame.

11. An image editing apparatus comprising:
    a display device which displays a frame on an image;
    an input device which inputs an instruction to move the displayed frame; and
    a processor which controls a movement amount and a magnification/reduction ratio of the frame in accordance with the instruction input by said input unit,
    wherein after the frame reaches an edge of the image, if the instruction to further move the frame to a direction toward the edge of the image is input by said input unit, said processor arithmetically operates the magnification/reduction ratio of the frame in accordance with a movement amount of the frame in the direction toward the edge of the image after the frame reaches the edge of the image so as to reduce a size of the frame.

12. A non-transitory computer-readable recording medium storing a program comprising a code for causing a computer to execute image editing comprising the steps of:
    displaying a frame on an image;

inputting an instruction to move the displayed frame; and
controlling a movement amount and a magnification/reduction ratio of the frame in accordance with the instruction input in said input step,
wherein after the frame reaches an edge of the image, if the instruction to further move the frame to a direction toward the edge of the image is input in said inputting step, said controlling step arithmetically operates the magnification/reduction ratio of the frame in accordance with a movement amount of the frame in the direction toward the edge of the image after the frame reaches the edge of the image so as to reduce a size of the frame.

* * * * *